United States Patent
Baratta et al.

(10) Patent No.: US 10,645,995 B2
(45) Date of Patent: May 12, 2020

(54) METHOD OF MAKING AND ARTICLE OF FOOTWEAR FORMED WITH GAS-FILLED POCKETS OR CHAMBERS

(71) Applicant: NIKE, Inc., Beaverton, OR (US)

(72) Inventors: John Baratta, Tigard, OR (US); Troy C. Lindner, Portland, OR (US); Sooman Park, Busan (KR); Kyoungmin Song, Busan (KR); Choulsoo Jeong, Yangsan (KR); Taewoo Kim, Busan (KR); Jisoo Lim, Busan (KR)

(73) Assignee: NIKE, Inc., Beaverton, OR (US)

( * ) Notice: Subject to any disclaimer, the term of this patent is extended or adjusted under 35 U.S.C. 154(b) by 443 days.

(21) Appl. No.: 13/739,094

(22) Filed: Jan. 11, 2013

(65) Prior Publication Data

US 2014/0196308 A1    Jul. 17, 2014

(51) Int. Cl.
| | |
|---|---|
| *A43B 13/20* | (2006.01) |
| *A43B 13/22* | (2006.01) |
| *A43B 13/18* | (2006.01) |
| *B29D 35/12* | (2010.01) |
| *B29D 35/14* | (2010.01) |
| *A43B 13/12* | (2006.01) |

(52) U.S. Cl.
CPC ............ *A43B 13/20* (2013.01); *A43B 13/122* (2013.01); *A43B 13/125* (2013.01); *A43B 13/184* (2013.01); *A43B 13/206* (2013.01); *A43B 13/223* (2013.01); *B29D 35/122* (2013.01); *B29D 35/142* (2013.01)

(58) Field of Classification Search
CPC ....... A43B 13/12; A43B 13/20; A43B 13/125; A43B 13/122; A43B 13/206; A43B 13/223; A43B 13/184; A43B 13/145; A43B 13/189; B29D 35/142
USPC .......... 36/29, 30 R, 21, 24, 14, 3 B, 3 R, 28
See application file for complete search history.

(56) References Cited

U.S. PATENT DOCUMENTS

| | | |
|---|---|---|
| 1,993,208 A | 3/1935 | Cohn |
| 2,527,414 A | 10/1950 | Hallgren |
| 4,012,855 A | 3/1977 | Gardner |
| 4,041,618 A | 8/1977 | Famolare, Jr. |
| 4,223,456 A | 9/1980 | Cohen |

(Continued)

FOREIGN PATENT DOCUMENTS

| | | |
|---|---|---|
| CN | 2614486 Y | 5/2004 |
| CN | 101902931 A | 12/2010 |

(Continued)

OTHER PUBLICATIONS

International Search Report and Written Opinion for PCT/US2014/011044, dated Apr. 25, 2014, 9 pages.

*Primary Examiner* — Megan E Lynch
(74) *Attorney, Agent, or Firm* — Banner & Witcoff, Ltd.

(57) ABSTRACT

An article of footwear is disclosed that includes a sole structure comprising a midsole and an outsole. The midsole has a plurality of midsole recesses formed in a bottom portion, and the outsole optionally defines a plurality of outsole recesses or other structures formed in a top portion thereof. The midsole recesses are formed to align with the outsole recesses to form a plurality of separately distinct fluid-filled chambers. Methods of designing such sole structures based on foot pressure data also are described.

20 Claims, 31 Drawing Sheets

(56) References Cited

U.S. PATENT DOCUMENTS

| | | | |
|---|---|---|---|
| 4,336,661 A | 6/1982 | Medrano | |
| 4,458,430 A | 7/1984 | Peterson | |
| 4,494,322 A | 1/1985 | Klagmann | |
| 4,597,199 A | 7/1986 | Hong | |
| 4,635,384 A | 1/1987 | Huh et al. | |
| 4,739,765 A | 4/1988 | Sydor et al. | |
| 4,742,625 A | 5/1988 | Sydor et al. | |
| 4,774,774 A | 10/1988 | Allen, Jr. | |
| 4,833,795 A * | 5/1989 | Diaz | A43B 13/206 36/11.5 |
| 4,837,948 A | 6/1989 | Cho | |
| 4,999,931 A * | 3/1991 | Vermeulen | A43B 13/185 36/153 |
| 5,042,175 A | 8/1991 | Ronen et al. | |
| 5,044,096 A | 9/1991 | Polegato | |
| 5,084,987 A | 2/1992 | Flemming | |
| 5,152,081 A | 10/1992 | Hallenbeck et al. | |
| 5,233,767 A | 8/1993 | Kramer | |
| 5,282,288 A | 2/1994 | Henson | |
| 5,283,963 A | 2/1994 | Lerner et al. | |
| 5,416,986 A | 5/1995 | Cole et al. | |
| 5,493,791 A | 2/1996 | Kramer | |
| 5,572,804 A | 11/1996 | Skaja et al. | |
| 5,673,498 A | 10/1997 | Amir et al. | |
| 5,768,806 A | 6/1998 | Parisotto | |
| 5,771,611 A | 6/1998 | Chang | |
| 5,782,014 A | 7/1998 | Peterson | |
| 5,794,359 A * | 8/1998 | Jenkins | A43B 13/206 36/28 |
| D398,145 S | 9/1998 | Ganon | |
| 5,896,678 A | 4/1999 | Ganon | |
| 5,930,919 A | 8/1999 | Mathias | |
| 5,956,869 A | 9/1999 | Kim | |
| 6,098,313 A * | 8/2000 | Skaja | A43B 13/181 36/28 |
| 6,266,896 B1 | 7/2001 | Liu | |
| 6,367,172 B2 | 4/2002 | Hernandez | |
| 6,408,544 B1 | 6/2002 | Hernandez | |
| 6,560,900 B2 | 5/2003 | Bray, Jr. et al. | |
| 6,564,476 B1 | 5/2003 | Hernandez | |
| 6,666,157 B1 | 12/2003 | Ganon | |
| 6,751,890 B1 * | 6/2004 | Tsai | A43B 7/081 36/29 |
| 6,754,981 B1 * | 6/2004 | Edwards | A43B 7/144 36/29 |
| 6,915,594 B2 | 7/2005 | Kim | |
| 7,080,467 B2 | 7/2006 | Marvin et al. | |
| 7,118,793 B2 | 10/2006 | Wang | |
| 7,134,223 B2 | 11/2006 | Ganon | |
| 7,152,343 B2 | 12/2006 | Whatley | |
| 7,178,267 B2 | 2/2007 | Skaja et al. | |
| 7,200,955 B2 * | 4/2007 | Foxen | A43B 7/1425 36/25 R |
| 7,254,906 B2 | 8/2007 | Morris et al. | |
| D553,835 S | 10/2007 | McClaskie | |
| 7,284,341 B2 | 10/2007 | Moseley | |
| 7,475,497 B2 | 1/2009 | Hoffer et al. | |
| 7,665,231 B2 | 2/2010 | Abadjian et al. | |
| 8,196,315 B2 * | 6/2012 | Ryu | A43B 7/08 36/29 |
| 2004/0088885 A1 | 5/2004 | Dinkins | |
| 2004/0154189 A1 * | 8/2004 | Wang | A43B 13/026 36/28 |
| 2005/0268490 A1 * | 12/2005 | Foxen | A43B 7/1425 36/28 |
| 2005/0283999 A1 * | 12/2005 | Whatley | A43B 13/20 36/29 |
| 2007/0220778 A1 | 9/2007 | Fusco et al. | |
| 2008/0289224 A1 * | 11/2008 | Sink | A43B 13/145 36/103 |
| 2009/0151195 A1 | 6/2009 | Forstrom | |
| 2010/0192420 A1 | 8/2010 | Favraud | |
| 2010/0293814 A1 * | 11/2010 | Skaja et al. | 36/25 R |
| 2011/0126428 A1 * | 6/2011 | Hazenberg | A43B 13/122 36/103 |
| 2011/0308106 A1 | 12/2011 | Lim | |
| 2012/0144695 A1 | 6/2012 | McDowell et al. | |
| 2012/0260524 A1 * | 10/2012 | Izquieta Anaut | A43B 13/187 36/28 |

FOREIGN PATENT DOCUMENTS

| | | | |
|---|---|---|---|
| CN | 102655775 A | 9/2012 | |
| CN | 202566555 U | 12/2012 | |
| DE | 9406345 | 7/1994 | |
| DE | 009406345 U1 * | 7/1994 | A43B 7/06 |

\* cited by examiner

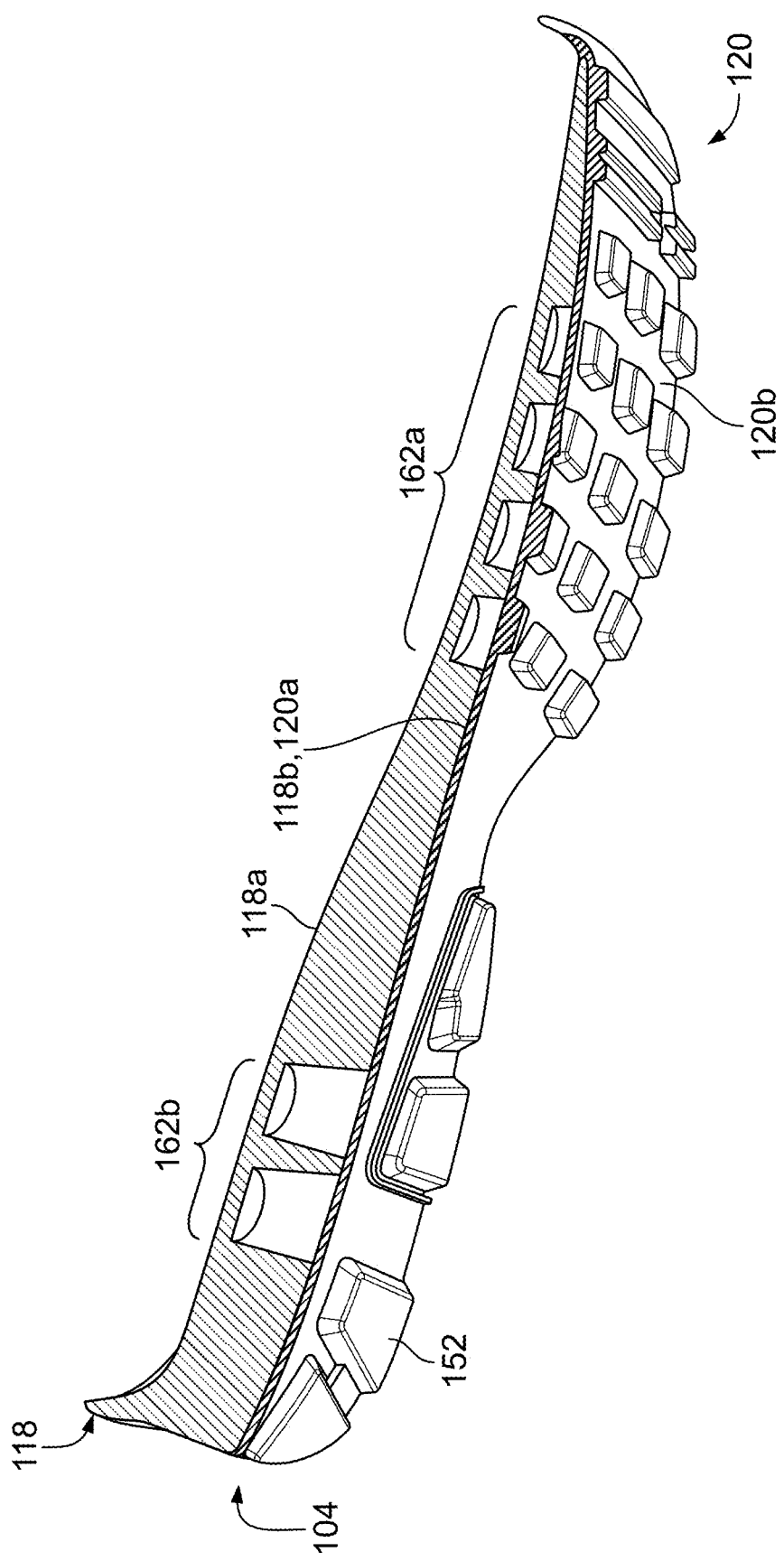

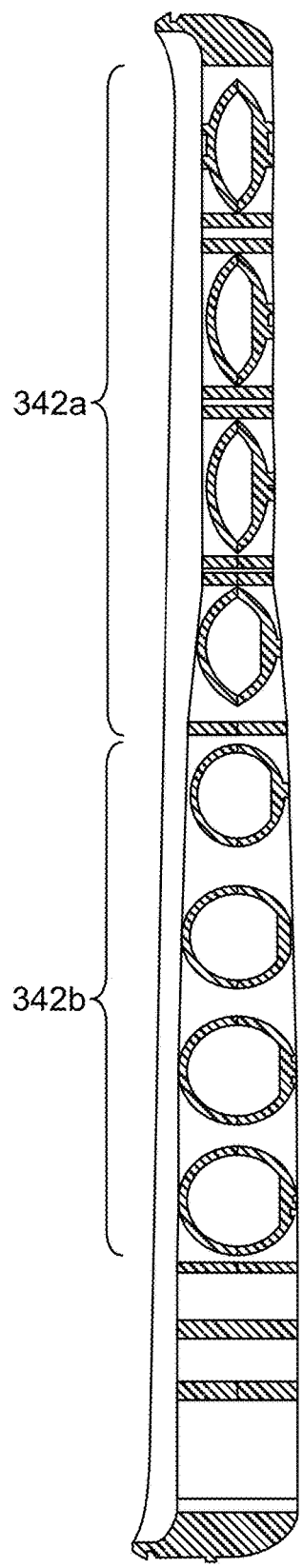
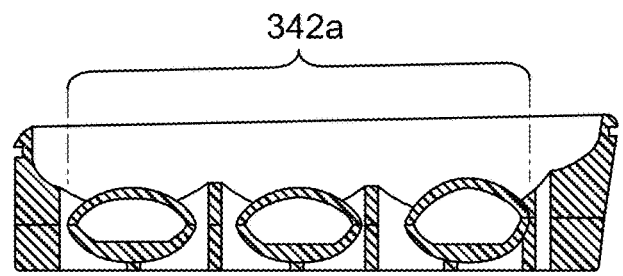
FIG. 3F
FIG. 3E

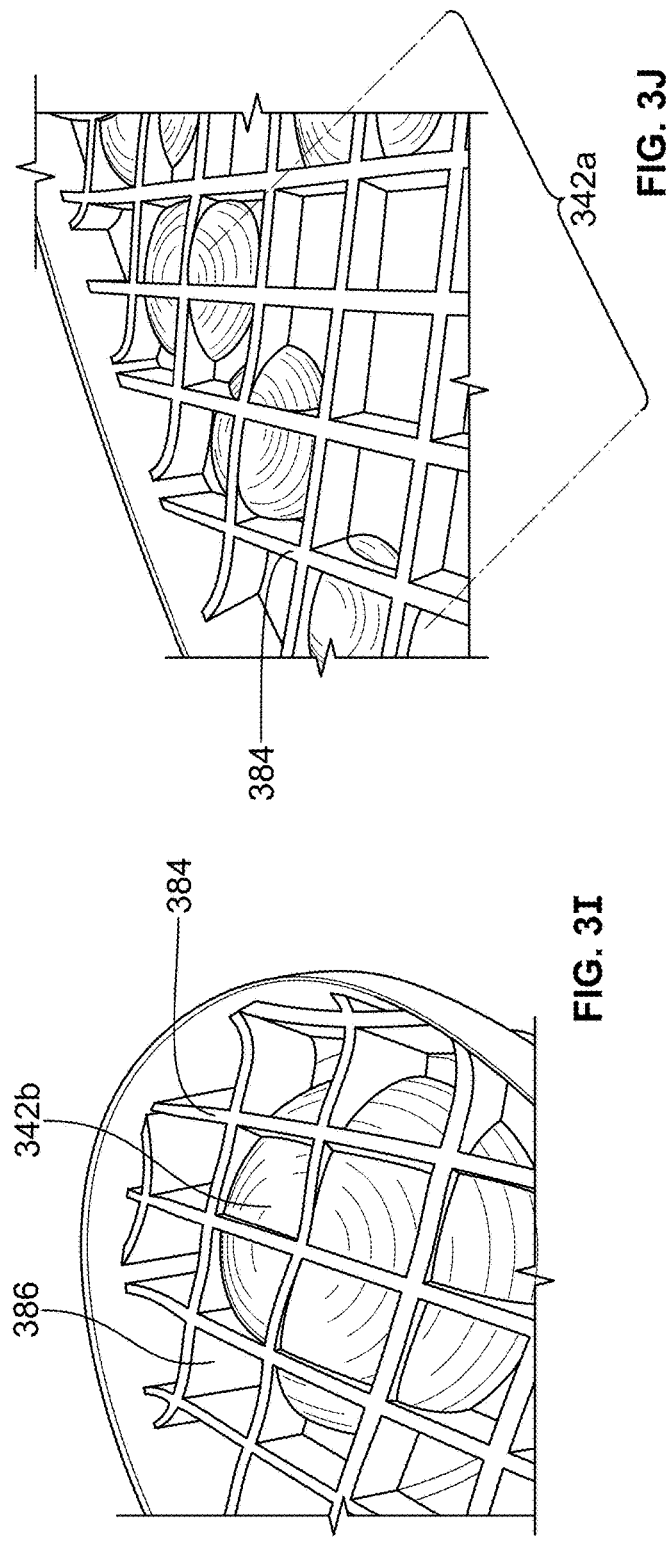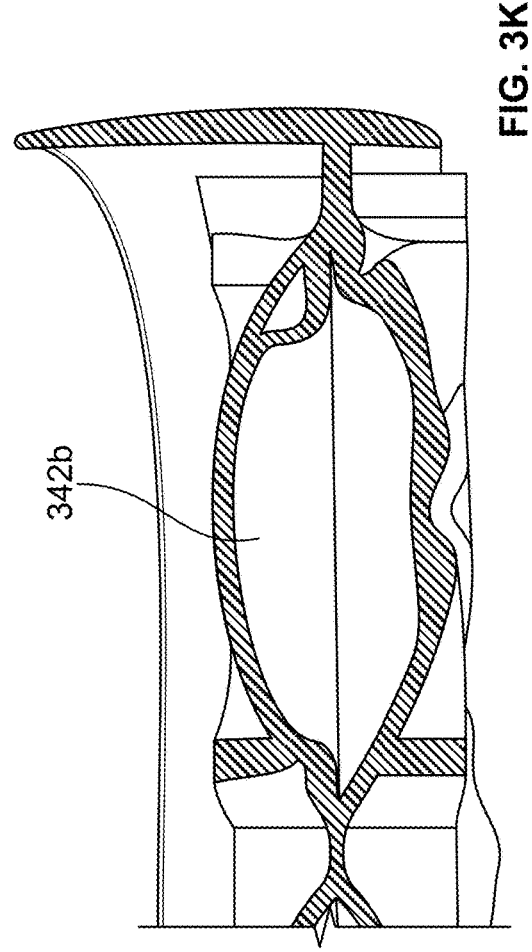
FIG. 3J
FIG. 3K
FIG. 3I

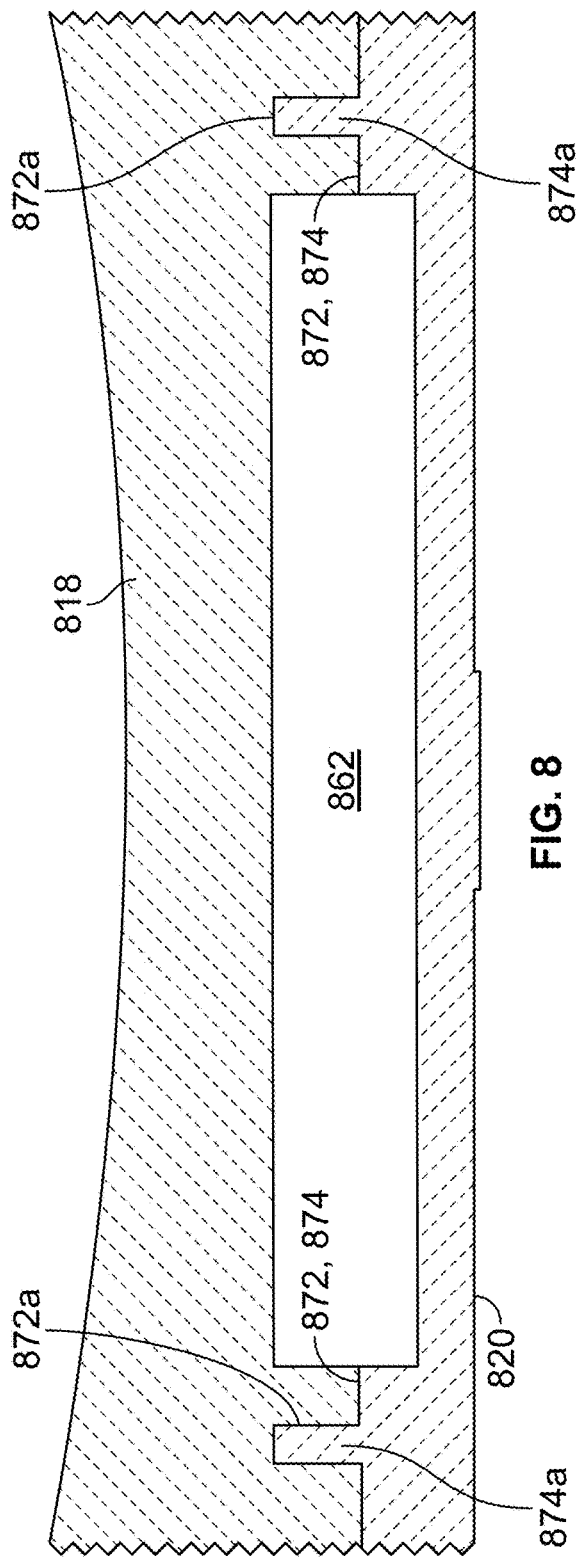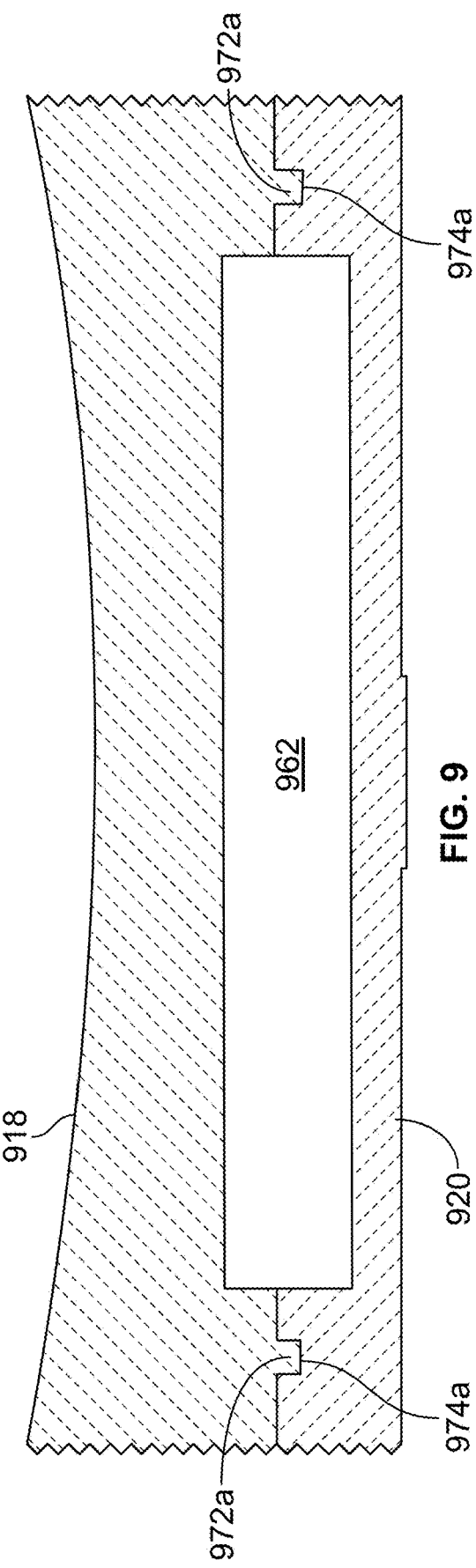

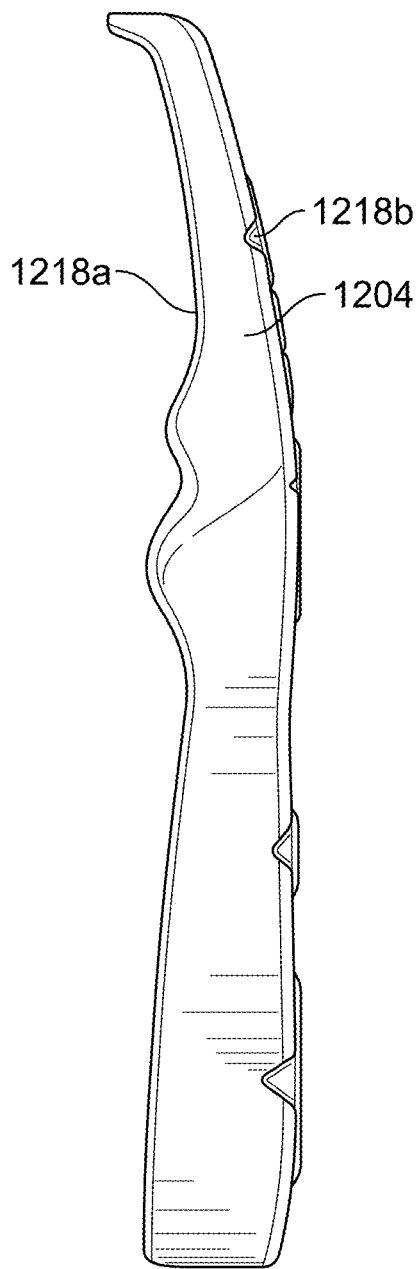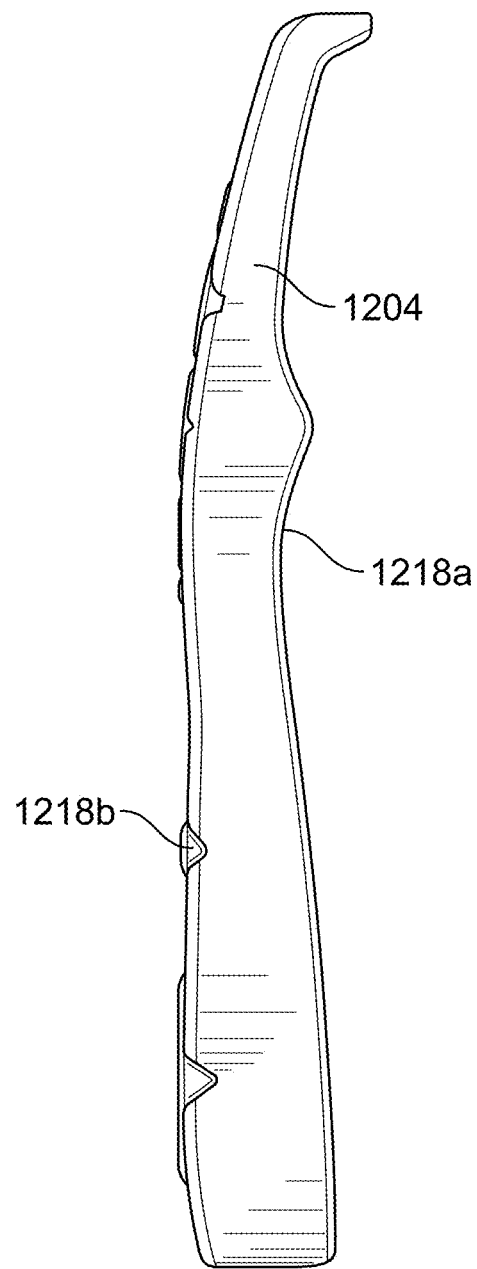
FIG. 12G  FIG. 12H

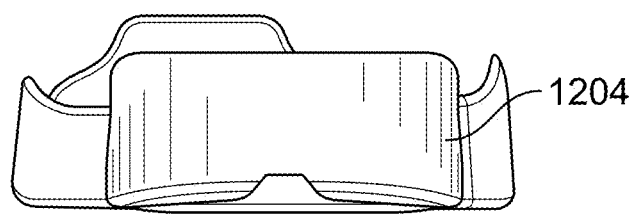
FIG. 12I
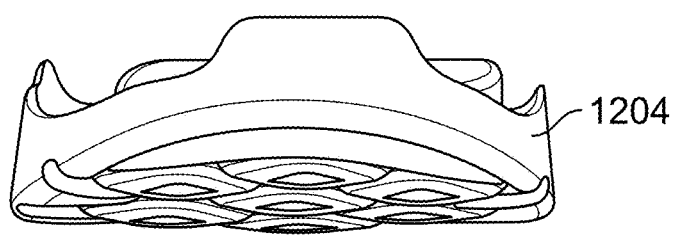
FIG. 12J
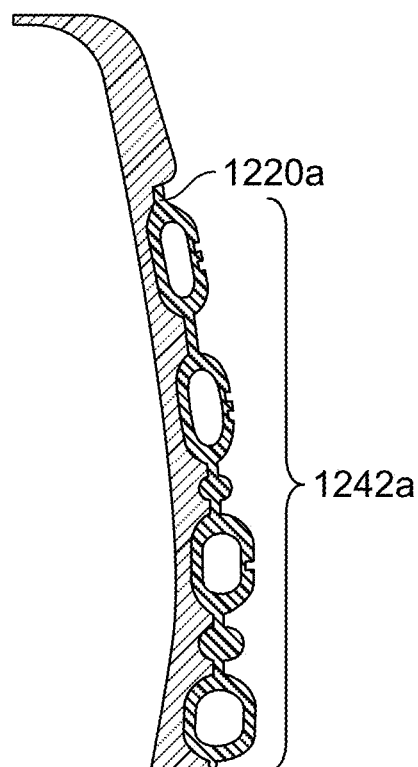
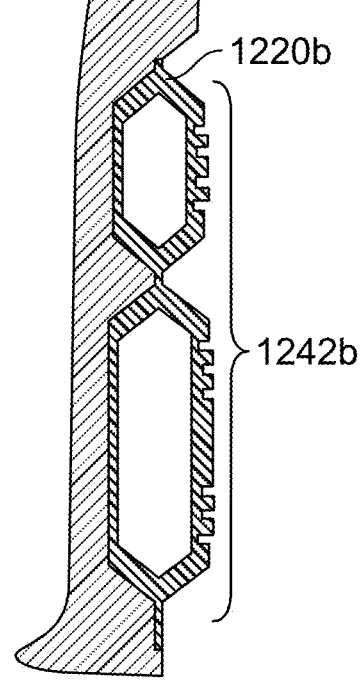
FIG. 12K

METHOD OF MAKING AND ARTICLE OF FOOTWEAR FORMED WITH GAS-FILLED POCKETS OR CHAMBERS

FIELD

The present disclosure relates to footwear. The disclosure concerns, more particularly, an article of footwear with a plurality of gas-filled pockets or chambers formed between a midsole and an outsole.

BACKGROUND

A conventional article of athletic footwear includes two primary elements, an upper and a sole structure. The upper and the sole structure operate cooperatively to provide a comfortable structure that is suited for a variety of activities such as walking and running. The upper provides a covering for the foot that securely receives and positions the foot with respect to the sole structure. In addition, the upper may have a configuration that protects the foot and provides ventilation, thereby cooling the foot and removing perspiration. The sole structure is secured to a lower surface of the upper and is generally positioned between the foot and the ground. In addition to attenuating ground reaction forces, the sole structure may provide traction and control foot motions.

Current sole structure designs, however, provide a large portion of the overall weight of the athletic footwear. Heavier athletic footwear directly impacts comfort of the wearer and may decrease performance during a multitude of activities such as running and walking Current sole structure designs have focused on using lighter weight materials in the design of the sole structure to reduce the overall weight of the athletic footwear.

The sole structure of athletic footwear generally exhibits a layered configuration that includes a comfort-enhancing insole, a resilient midsole formed from a polymer foam material, and a ground-contacting outsole that provides both abrasion-resistance and traction. The midsole is the primary sole structure element that attenuates ground reaction forces and controls foot motions. Suitable polymer foam materials for the midsole include ethylvinylacetate or polyurethane that compress resiliently under an applied load to attenuate ground reaction forces. Conventional polymer foam materials are resiliently compressible, in part, due to the inclusion of a plurality of open or closed cells that define an inner volume substantially displaced by gas. The polymer foam materials of the midsole also may absorb energy when compressed during ambulatory activities.

The midsole may be formed from a unitary element of polymer foam that extends throughout the length and width of the footwear. With the exception of a thickness differential between the heel and forefoot areas of the footwear, such a midsole exhibits substantially uniform properties in each area of the sole structure.

SUMMARY

The following presents a simplified summary of various aspects of the invention described herein. This summary is not an extensive overview, and it is not intended to identify key or critical elements or to delineate the scope of the claims. The following summary merely presents some concepts relating to this invention in a simplified form as an introduction to the more detailed description provided below.

Some aspects of this invention relate to sole structures for articles of footwear. Such sole structures may include: (a) a midsole having a plurality of midsole recesses formed in a bottom portion thereof and (b) an outsole defining a plurality of outsole recesses formed in a top portion thereof. In this construction, the midsole recesses align with the outsole recesses to form a plurality of separately distinct fluid-filled chambers (e.g., chambers including at least one side wall and a top wall with trapped air or other gas contained therein). The outsole may include a tread or traction element design or appearance that corresponds in size and/or shape to at least some of the outsole recesses. The fluid-filled chambers can provide a desired degree of impact force attenuation for the sole structure, e.g., in the heel and/or forefoot areas of the sole structure.

Sole structures in accordance with other examples and aspects of this invention may include:
(a) a first midsole component including a top surface and a bottom surface opposite the top surface, wherein the bottom surface of the first midsole component includes: (i) a first recess including one or more interior walls extending in a direction toward the top surface of the first midsole component, wherein a first engagement surface extends around at least a portion of a perimeter of the first recess, and (ii) a second recess including one or more interior walls extending in a direction toward the top surface of the first midsole component, wherein a second engagement surface extends around at least a portion of a perimeter of the second recess; and
(b) a first outsole component including a top surface and a bottom surface opposite the top surface, wherein the top surface of the first outsole component includes: (i) a third engagement surface and one or more interior walls extending from the third engagement surface and in a direction toward the bottom surface of the first outsole component, and (ii) a fourth engagement surface and one or more interior walls extending from the fourth engagement surface and in a direction toward the bottom surface of the first outsole component,
wherein the first midsole component and first outsole component are engaged together such that: (i) the first engagement surface engages the third engagement surface so that the first recess and the top surface of the first outsole component form a first enclosed (and optionally sealed) fluid-filled chamber, (ii) the second engagement surface engages the fourth engagement surface so that the second recess and the top surface of the first outsole component form a second enclosed (and optionally sealed) fluid-filled chamber, and wherein (iii) the first enclosed fluid-filled chamber and the second enclosed fluid-filled chamber are not in fluid communication with one another. The chambers may be filled with air or other gas.

Additional aspects of this invention relate to articles of footwear including the sole structures described above and to methods of making such sole structures and articles of footwear.

Other aspects of this invention relate to methods of designing sole structures for articles of footwear. Such methods may include: (a) obtaining at least two-dimensional foot pressure data relating to contact force of a foot with a contact surface; and (b) creating a footwear midsole design including plural recesses in a midsole material, wherein at least one of a recess size, a recess position with respect to a footbed of the sole structure, or a recess position with respect to another recess in the sole structure is determined for the footwear midsole design based on the foot pressure data. Still additional aspects of this invention relate to footwear sole structures designed by the methods described above.

DESCRIPTION OF THE DRAWINGS

A more complete understanding of the present disclosure and the advantages thereof may be acquired by referring to the following description in consideration of the accompanying drawings, in which like reference numbers indicate like features, and wherein:

FIGS. 2A through 2H illustrate various views of a sole structure and various component parts thereof in accordance with some example of this invention.

FIGS. 3A-3K illustrate alternative outsole components including fluid-filled chambers in accordance with some examples of this invention.

FIG. 8 illustrates a cross sectional view of an alternative engagement between a midsole component and an outsole component in accordance with some examples of this invention.

FIG. 9 illustrates a cross sectional view of another alternative engagement between a midsole component and an outsole component in accordance with some examples of this invention.

DETAILED DESCRIPTION

Figure 1:
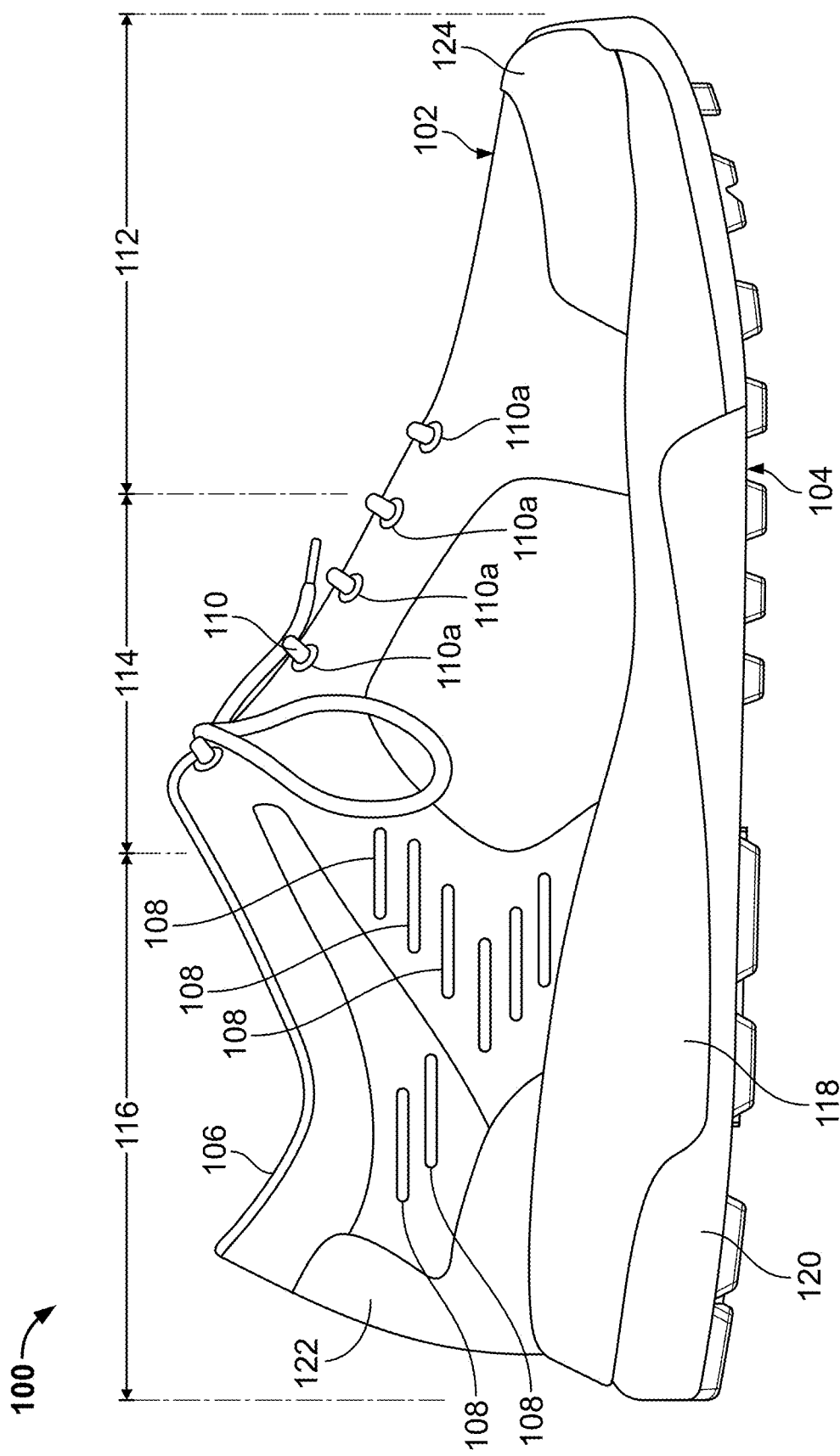
FIG. 1 illustrates a side view of an article of footwear in accordance with one example of this invention.

In the following description of various example structures in accordance with this invention, reference is made to the accompanying drawings, which form a part hereof, and in which are shown by way of illustration various structures and environments in which aspects of the invention may be practiced. It is to be understood that other structures and environments may be utilized and structural and functional modifications may be made to the described features without departing from the scope of the present invention. The invention is capable of being formed in other structures and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

The following discussion and accompanying figures disclose an article of footwear having fluid-filled chambers formed between a midsole and an outsole in at least some example structures. Concepts related to fluid-filled chambers formed between a midsole and an outsole are disclosed with reference to footwear having a configuration that is suitable for various athletic activities, including, for example, running, training, basketball, and football. This disclosure is not solely limited to articles of footwear designed for running, training, basketball, and football however, and it may be applied to a wide range of athletic footwear styles that includes but is not limited to: walking shoes, hiking shoes and boots, tennis shoes, volleyball shoes, soccer shoes, and golf shoes. In addition to athletic footwear, concepts related to the present disclosure may be applied to footwear that is generally considered to be non-athletic (e.g., dress shoes, sandals, and work boots) or footwear serving a medical or rehabilitative purpose. Accordingly, one skilled in the relevant art will appreciate that the concepts disclosed herein apply to a wide variety of footwear styles, in addition to the specific footwear style discussed in the following material and depicted in the accompanying figures.

I. General Description of Features and Aspects of this Invention

Some aspects of this invention relate to sole structures for articles of footwear. Such sole structures may include: (a) a midsole having a plurality of midsole recesses formed in a bottom portion thereof and (b) an outsole defining a plurality of outsole recesses formed in a top portion thereof. In this construction, the midsole recesses align with the outsole recesses to form a plurality of separately distinct fluid-filled chambers (e.g., chambers including at least one side wall and a top wall with trapped air or other gas contained therein). The outsole may include a tread or traction element design or appearance that corresponds in size and/or shape to at least some of the outsole recesses.

The fluid-filled chambers may be formed by seams surrounding a perimeter of the midsole recesses and the outsole recesses. One of the perimeter of the midsole recess or the perimeter of the outsole recess may be formed to include a tongue element and the other perimeter may be formed to include a groove defined therein. The tongue and groove engage together to form a seam (and to optionally seal off the chamber). The fluid-filled chambers can provide a desired degree of impact force attenuation for the sole structure. Optionally, if one or more fluid-filled chambers are provided in both the forefoot region and the heel region of a sole structure, the impact force attenuation effect (e.g., the feel, the degree of foam compression, the collapse of the recess wall(s), etc.) may be different in the forefoot area as compared to the heel area.

Sole structures in accordance with some examples of this invention may include:

(a) a first midsole component including a top surface and a bottom surface opposite the top surface, wherein the bottom surface of the first midsole component includes: (i) a first recess including one or more interior walls extending in a direction toward the top surface of the first midsole component, wherein a first engagement surface extends around at least a portion of a perimeter of the first recess, and (ii) a second recess including one or more interior walls extending in a direction toward the top surface of the first midsole component, wherein a second engagement surface extends around at least a portion of a perimeter of the second recess; and (b) a first outsole component including a top surface and a bottom surface opposite the top surface, wherein the top surface of the first outsole component includes: (i) a third engagement surface and one or more interior walls extending from the third engagement surface and in a direction toward the bottom surface of the first outsole component, and (ii) a fourth engagement surface and one or more interior walls extending from the fourth engagement surface and in a direction toward the bottom surface of the first outsole component, wherein the first midsole component and first outsole component are engaged together such that: (i) the first engagement surface engages the third engagement surface so that the first recess and the top surface of the first outsole component form a first enclosed (and optionally sealed) fluid-filled chamber, (ii) the second engagement surface engages the fourth engagement surface so that the second recess and the top surface of the first outsole component form a second enclosed (and optionally sealed) fluid-filled chamber, and wherein (iii) the first enclosed fluid-filled chamber and the second enclosed fluid-filled chamber are not in fluid communication with one another. The various engagement surfaces may have tongue-and-groove type constructions as described above (and as will be described in more detail below). The chambers may be filled with air or other gases.

The first midsole and outsole components described above may be located in the heel area or the forefoot area (or other area) of the sole structure. Optionally, if desired, the first midsole and outsole components could include structures so as to form fluid-filled chambers in both the forefoot and the heel areas of the sole structures. As yet additional alternatives, if desired, the heel and forefoot areas of a sole structure could include separate and independent sets of midsole and outsole components that each form fluid-filled chambers. As further examples, if desired, a single midsole component could include both heel and forefoot areas with recesses formed therein, and this single midsole component could be engaged with two (or more) independent outsole components to thereby form fluid-filled chambers in the heel and forefoot areas. As yet another alternative, if desired, separate heel and forefoot midsole components with recesses formed therein could engage a single outsole component that includes both heel and forefoot support regions to thereby form fluid-filled chambers in the heel and forefoot areas.

The various fluid-filled chambers may take on any desired arrangement, orientation, size, shape, draft angle, and/or relative positioning. For example, in some sole structures, the first enclosed fluid-filled chamber and the second enclosed fluid-filled chamber described above may at least partially align with one another in a medial side-to-lateral side (transverse) direction across the sole structure. As another example, the first enclosed fluid-filled chamber and the second enclosed fluid-filled chamber disclosed above may at least partially align with one another in a heel-to-toe (longitudinal) direction across the sole structure.

As for sizes, as some options, when the bottom surface of the outsole component is placed on a horizontal surface, at least some of the fluid-filled chambers of the sole structure may have a largest or maximum horizontal cross sectional area of 5 in$^2$ or less, and in some examples, 3 in$^2$ or less. For at least some of the fluid-filled chambers, this largest horizontal cross sectional area may be within a range of 0.5 in$^2$ to 5 in$^2$, or even within a range of 0.5 in$^2$ to 3 in$^2$. As for volumes, at least some of the fluid-filled chambers may have a volume of less than 5 in$^3$, and in some examples, a volume of less than 2.5 in$^3$ or even less than 2 in$^3$. For at least some of the fluid-filled chambers, this volume will be within a range of 0.25 in$^3$ to 2.5 in$^3$, or even within a range of 0.5 in$^3$ to 2 in$^3$. The fluid-filled chambers may be arranged in a sole structure such that at least some portions of these chambers are separated by a distance of less than 0.5 inches or even by a distance of less than 0.375 inches or less than 0.25 inches.

Additional aspects of this invention include articles of footwear having the various sole structures described above. The sole structures may be engaged with uppers of any desired construction and in any desired manner without departing from this invention, including uppers of conventional constructions and engaged in conventional manners as are known and used in the art.

Still additional aspects of this invention relate to manners of making sole structures, e.g., of the types described above. The midsole components may be made, for example, by molding processes (e.g., molding foam materials, such as polyurethane foam, ethylvinylacetate foam, and the like, including injection molding, blow molding, etc.), including techniques as are conventionally known and used in the footwear art. The outsole components may be made by molding (e.g., injection molding, compression molding, etc.), extrusion, or other techniques, including techniques as are conventionally known and used in the footwear art. The midsole and outsole components may be engaged together using cements or adhesives, mechanical connectors, fusing techniques, etc., including in manners that are conventionally known and used in the footwear art. When engaged with an upper, the upper and sole structure may be engaged using cements or adhesives, mechanical connectors, fusing techniques, etc., including in manners that are conventionally known and used in the footwear art.

Other aspects of this invention relate to methods of designing sole structures for articles of footwear. Such methods may include: (a) obtaining at least two-dimensional foot pressure data relating to contact force of a foot with a contact surface; and (b) creating a footwear midsole and/or outsole design including plural recesses in a midsole and/or outsole material, wherein at least one of a recess size, recess dimensions or other specifications, a recess position with respect to a footbed of the sole structure, or a recess position with respect to another recess in the sole structure is determined for the footwear midsole and/or outsole design based on the foot pressure data. The foot pressure data may include one or more of the following: foot pressure data of a stationary (or standing) person, foot pressure data of a moving person, foot pressure data of a person walking, foot pressure data of a person running, foot pressure data of a person backpedalling, foot pressure data of a person jumping (e.g., landing a jump and/or initiating a jump), foot pressure data of a person making a direction change maneuver, foot pressure data for a heel area, and foot pressure data for a forefoot area. The foot pressure data may be taken on a barefoot subject, on a subject wearing a sock, or on a subject wearing an article of footwear.

Using these methods (based on the foot pressure data), the plural recesses can be sized, shaped, dimensioned, oriented, and/or arranged in a midsole and/or outsole in a manner that better supports the wearer's foot for the desired type(s) of activities. These methods allow for various degrees of customization. For example, an individual customer's foot can be scanned under the appropriate conditions for the use of the shoe (e.g., running, walking, etc.), and based on the foot pressure data, a midsole and/or outsole can be designed with recesses and fluid-filled chambers formed therein to provide adequate support at the necessary areas and adequate compressibility at other necessary areas. Elimination of unnecessary midsole material (e.g., foam material) by forming the recesses also can help lighten the midsole.

As an alternative to individual customization, a footwear manufacturer can use foot pressure data from a number of subjects to design and create midsoles and/or outsoles with recess patterns and/or other structures designed to provide adequate support at the necessary locations for a specific class of wearers and/or for the anticipated activities for which the shoe will be used. Thus, shoes could be constructed and marketed with information enabling a user to select the proper shoe based on one or more of the following: the user's weight and/or height; the user's gait style (e.g., excessive pronator, moderate pronator, neutral, moderate supinator, excessive supinator, etc.); the type of activity or sport being played by the wearer; the position to be played by the wearer; the user's typical speed or fitness level; etc. Optionally, if desired, footwear could be marketed with one or more different drop in midsole components that fit into a footwear shell (e.g., an upper and outsole), and optionally the midsole components will have different recess patterns to facilitate different uses (or wearers) of the shoe (e.g., a running midsole, a walking midsole, a tennis midsole, a basketball midsole, a golf midsole, etc.).

Further aspects of this invention include making a sole structure (e.g., of one of the types described above and/or of one of the types described in more detail below) based on the design determined by the methods described above, as well as to the sole structures designed and/or produced by the methods described above.

Given the above general description of various features and aspects of this invention, more detailed descriptions of various specific examples of the footwear and methods of this invention are provided below.

II. Description Specific Examples of this Invention

As generally illustrated in FIG. 1, an article of footwear 100 can include an upper 102 and a sole structure 104 that are suitable for a variety of athletic or other ambulatory activities. The upper 102 may be constructed from a plurality of material elements (e.g., textiles, foam, and leather) or parts that are stitched, adhesively bonded, and/or fuse bonded together to form at least a portion of an interior void for securely and comfortably receiving a foot (the ankle opening 106 provides access to this interior void). The material elements or parts may be selected and located with respect to upper 102 in order to selectively impart properties of durability, air-permeability, wear-resistance, flexibility, and/or comfort. Moreover, the upper 102 may comprise a plurality of air slots 108 throughout upper 102 to increase air flow through upper 102 and decrease weight of upper 102. In addition, the upper 102 may include a lace 110 that is utilized in a conventional manner to modify the dimensions of the interior void, thereby securing the foot within the interior void and facilitating entry and removal of the foot from the interior void. The lace 110 may extend through apertures 110a in the upper 102, and a tongue portion of the upper 102 may extend between the interior void and the lace 110. In addition, the upper 102 may incorporate a sock liner that is positioned within the interior void of the upper 102 and located to correspond with a plantar (i.e., lower) surface of the foot, thereby enhancing the comfort of footwear 100.

Referring to FIG. 1, to assist in describing various aspects of the disclosure herein, footwear 100 may be considered as being divided into three general regions: a forefoot region 112, a midfoot region 114, and a heel region 116, as illustrated in FIG. 1. Forefoot region 112 generally includes the portion of the footwear 100 which corresponds to the toes and the joints connecting the metatarsals with the phalanges. Midfoot region 114 generally includes portions of footwear 100 corresponding with the arch area of the foot, and the heel region 116 corresponds with rear portions of the foot, including the calcaneus bone. Footwear 100 also includes a lateral side (the outside of the shoe) and a medial side (the inside of the shoe). Regions 112, 114, 116 and medial and lateral sides are not intended to demarcate precise areas of footwear 100. Rather, these regions 112-116 and sides and are intended to represent general areas of footwear 100 to aid in the following discussion.

The upper 102 may have any desired construction or number of parts, including conventional constructions and/ or parts as are known and used in the art. FIG. 1 further shows that this example upper 102 includes a heel counter 122 to provide support in the heel area and a toe cap 124 to provide wear resistance and abrasion resistance in the toe area. Other desired structures and/or components may be included in an upper construction without departing from this invention.

FIG. 1 further illustrates that the sole structure 104 of an article of footwear 100 may include a midsole component 118 and an outsole component 120 engaged with the midsole component 118. The midsole component 118 may be made from one or more different parts and from a variety of materials without departing from this invention. As some more specific examples, the midsole component 118 may be made from a polymeric foam material, such as a polyurethane foam, an ethylvinylacetate foam, phylon, phylite, or the like, including conventional foam or other midsole materials as are known and used in the footwear art. If desired, the midsole 118 may be formed from a dual-density foam material, e.g., a foam material for the lateral side of the midsole (at least in the heel area) may be formed from a softer foam material than that for the medial side. If desired, a single foam component may be made to have this type of dual density characteristic (e.g., by molding the midsole with different materials in different areas, by treating different areas to harden or soften the foam at that area, etc.).

The outsole component 120 also may be made from one or more independent parts and from a variety of materials without departing from this invention. As some more specific examples, the outsole component 120 may be made from a durable and abrasion-resistant material, such as rubber (synthetic or natural), thermoplastic polyurethanes, phylon, phylite, etc., including conventional outsole materials as are known and used in the art. The outsole component 120 may be engaged with the midsole component 118 in any desired manner, including in manners as are known and used in the art, such as through the use of cements or adhesives, mechanical connectors, fusing techniques, or the like. Additionally, the sole structure 104 may be engaged with the upper 102 in any desired manner, including in manners as are known and used in the art, such as through the use of cements or adhesives, mechanical connectors, fusing techniques, or the like.

Figure 2A:
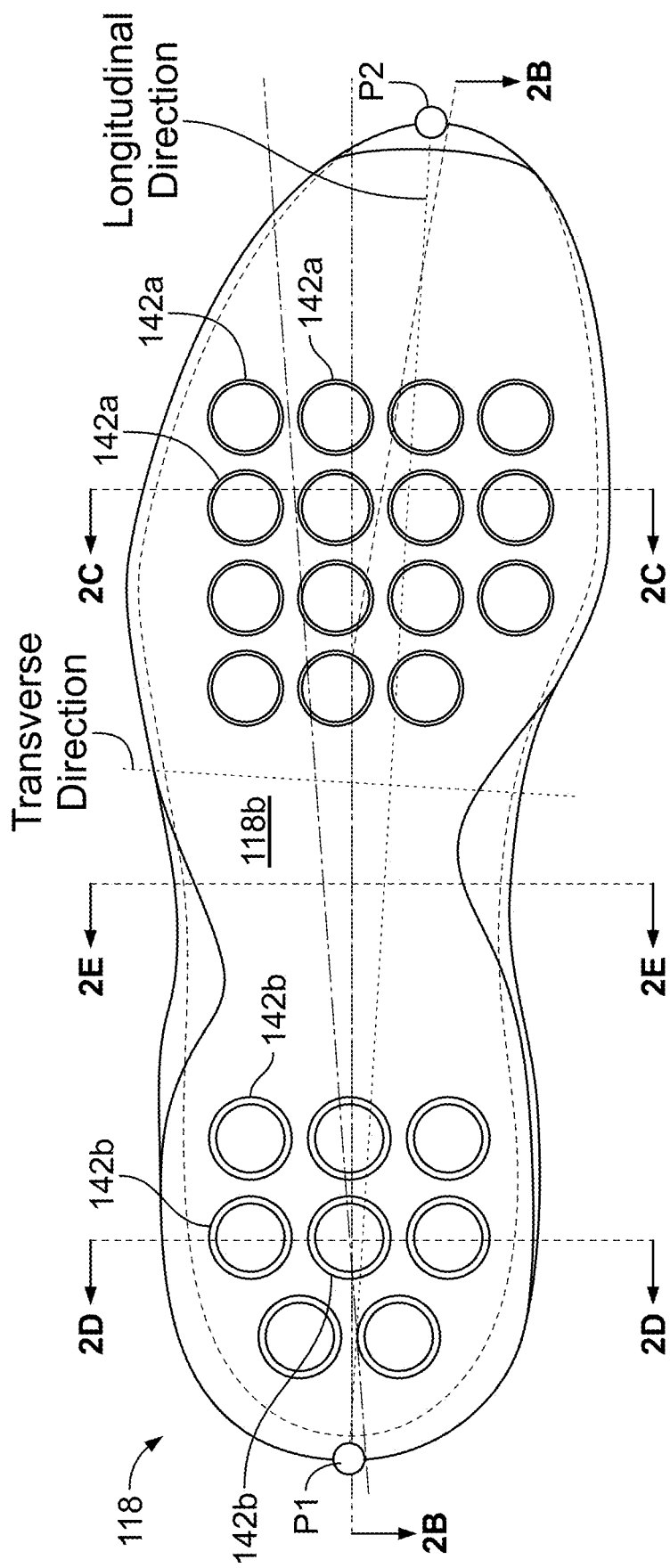
Figure 2B:
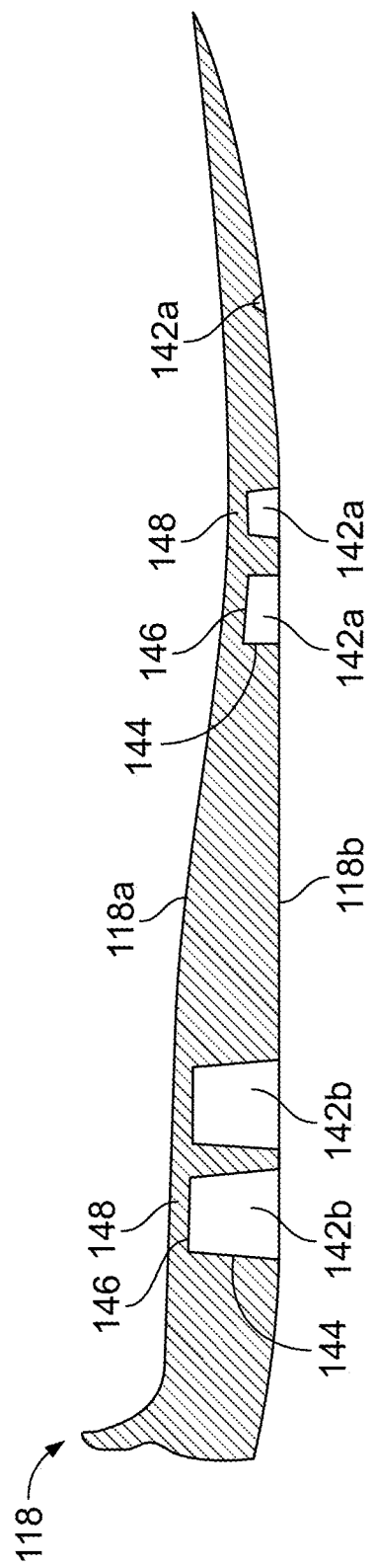
Figure 2C:
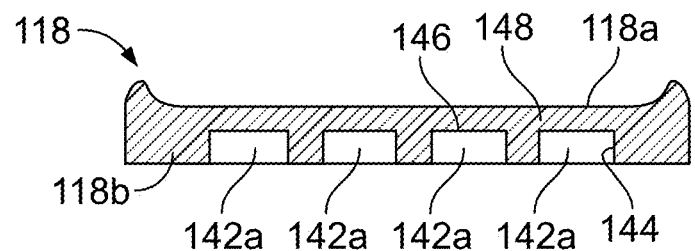

Referring to FIGS. 2A through 2H, one example sole structure 104 that may be used in accordance with at least some aspects of this invention will be described in more detail. FIG. 2A provides a bottom view of the midsole component 118 of this example sole structure. FIG. 2B is a cross sectional view of midsole component 118 taken along line B-B in FIG. 2A. FIG. 2C is a cross sectional view of midsole component 118 taken along line C-C in FIG. 2A.

Figure 2D:
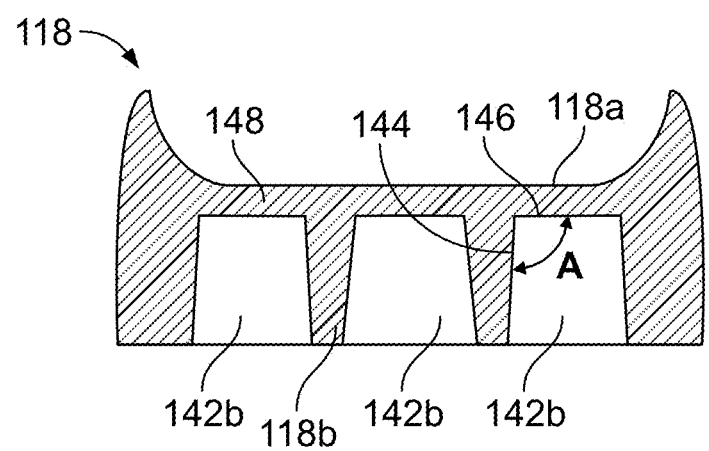
Figure 2E:
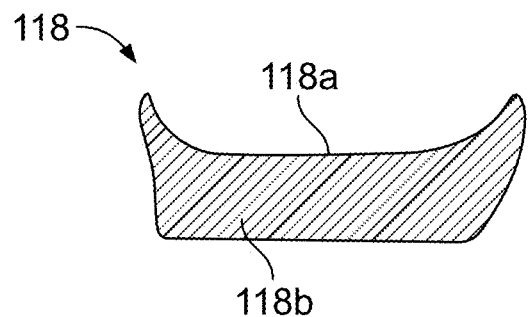
Figure 2F:
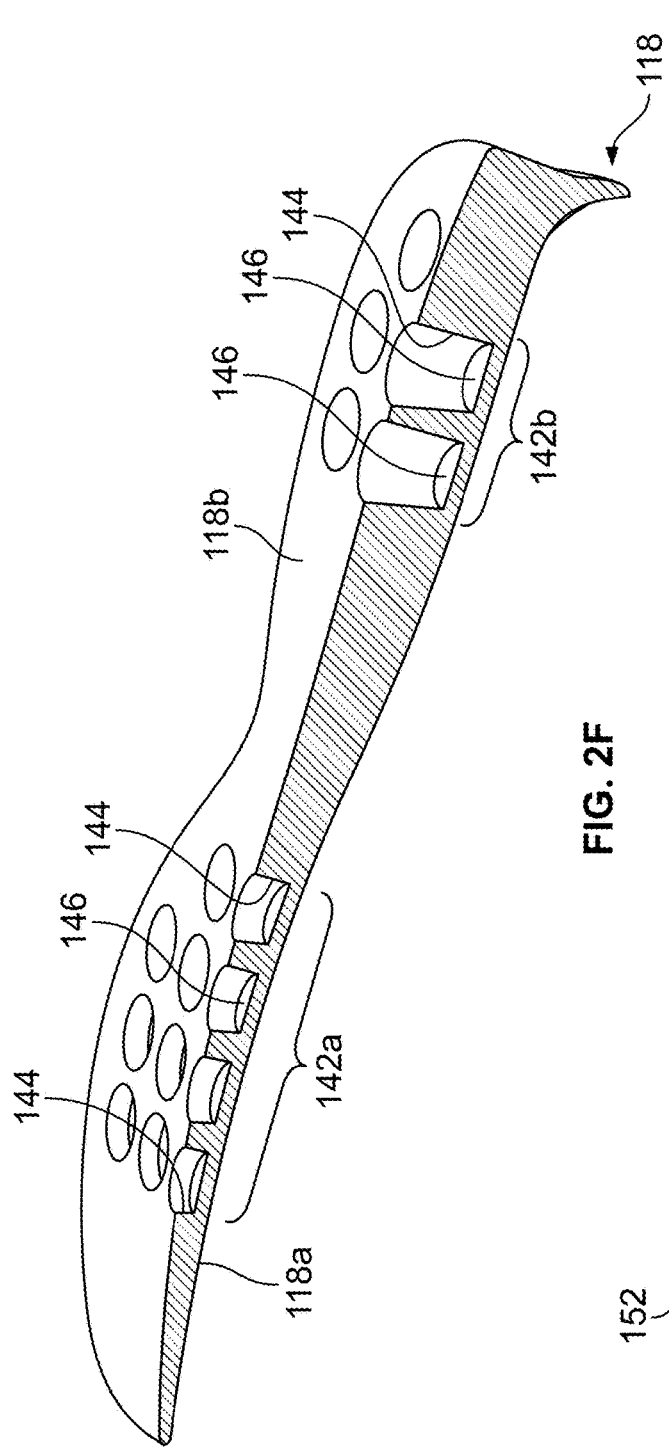
Figure 2G:
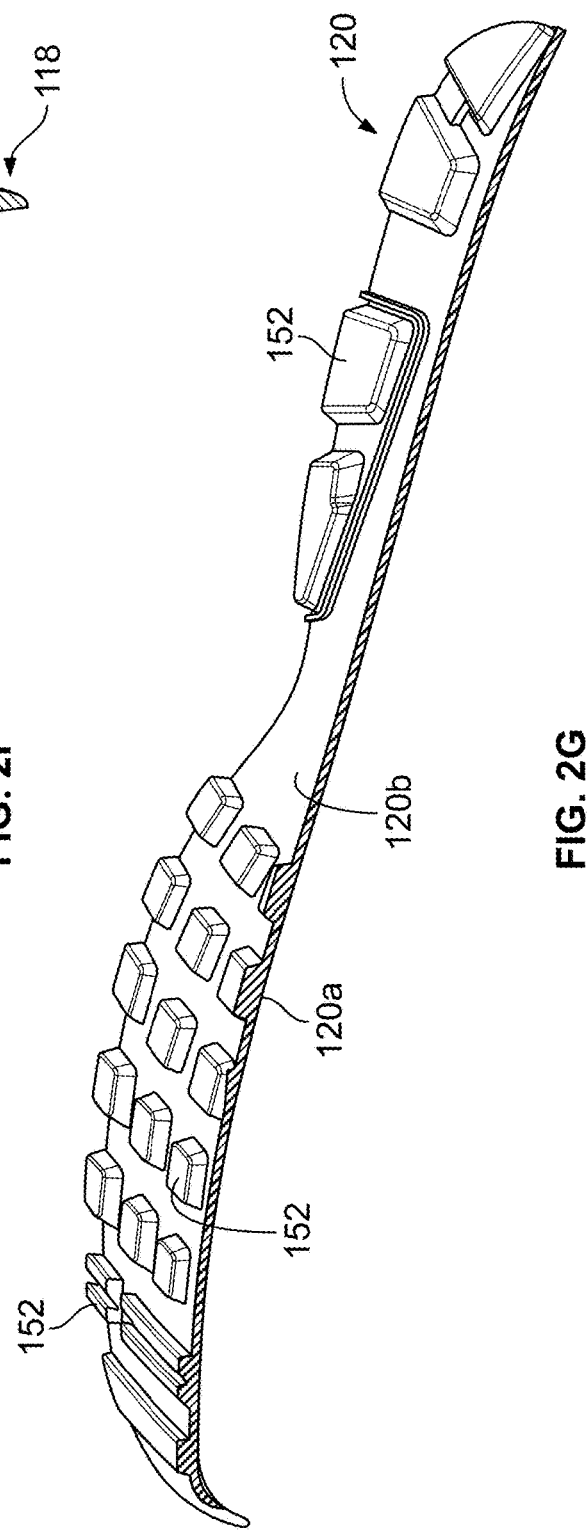

FIG. 2D is a cross sectional view of midsole component 118 taken along line D-D in FIG. 2A. FIG. 2E is a cross sectional view of midsole component 118 taken along line E-E in FIG. 2A. FIG. 2F is a cutaway perspective view of the midsole component 118. FIG. 2G is a cutaway perspective view of outsole component 120. FIG. 2H is a cutaway perspective view of sole structure 104.

As depicted in these figures, midsole 118 may include an upper midsole surface 118a and a lower midsole surface 118b. The upper midsole surface 118a may be contoured, e.g., shaped to comfortably support and hold the wearer's foot. The midsole 118 further may be formed with recesses 142a in the forefoot region and/or recesses 142b in the heel region for receiving air (or other gas). The recesses 142a, 142b of this illustrated example are formed at the lower midsole surface 118b to trap air or other fluid between the midsole 118 and the outsole 120, as will be explained in more detail below.

In this illustrated example midsole structure 118, the recesses 142a and 142b constitute blind holes formed in the bottom surface 118b of the midsole 118 that extend in a direction toward (but not completely to) a top surface 118a of the midsole component 118. The recesses 142a and 142b include at least one interior wall, and they may take on any desired shape without departing from this invention. In this illustrated example, the recesses 142a and 142b are generally cylindrical or frusto-conical shaped, with one or more interior side walls 144 and an end wall 146. These example recesses 142a and 142b have a generally circular cross sectional shape (horizontal cross section), although other horizontal cross sectional shapes may be provided without departing from this invention, including triangular, rectangular, square, pentagonal, hexagonal, oval, elliptical, etc.

As noted above, the recesses 142a and 142b in this example midsole component 118 are formed as blind holes. Furthermore, in this illustrated example, the midsole component 118 constitutes a unitary, one piece construction that includes portions for supporting both the heel area and the forefoot area of the wearer's foot (as well as the arch area). Therefore, as shown in FIGS. 2B, 2C, and 2D, a continuous layer of midsole material overlays the recesses 142a and 142b and forms the top surface 118a of the midsole component 118. Above the recesses 142a and 142b, this continuous layer may have any desired thickness without departing from this invention, and the thickness may vary over the overall top surface 118a area (for supporting the plantar surface of a wearer's foot). In the figures, the layer of midsole material overlaying the recesses 142a, 142b is represented by reference number 148. As some more specific examples, the thickness of the midsole material 118 located over recesses 142a, 142b may range from 2 mm to 15 mm thick, and in some examples, from 2.5 to 10 mm thick.

As an alternative, if desired, the midsole component 118 may be made from two or more component parts without departing from this invention. For example, if desired, the midsole component 118 could include a first midsole part that includes through holes that function as recesses 142a and 142b, and a second midsole part may overlay the first part to cover at least some of the recesses 142a, 142b (e.g., vertically stacked midsole parts). In this manner, the second midsole part may form the plantar foot support surface of the midsole 118 and provide the layer 148 overlaying the recesses 142a, 142b (and provide the top surface 118a). For reasons to be described in more detail below, in such a construction, the overlaying second midsole part may be engaged with the first midsole part (which includes the through holes) in a sealed or gas-tight manner. As another option, if desired, the bottom surface 118b of the midsole component 118 also could be covered by a lower layer of midsole material. As still some other examples, if desired, the midsole component 118 may include a heel supporting component and a separate forefoot supporting component (optionally, with the arch area devoid of midsole). Other optional structures and features of the midsole components will be described in more detail below.

As described above, midsole component 118 may be joined to an outsole component 120 to create an overall sole structure 104. FIG. 2G shows a cut away perspective view of one example outsole component 120, and FIG. 2H shows a cutaway perspective view of this outsole component 120 engaged with the midsole component 118 of FIGS. 2A through 2F. This outsole component 120 includes an upper surface 120a (that engages the bottom surface 118b of midsole component 118) and a bottom surface 120b. The bottom surface 120b of the outsole component 120 may be formed to include traction elements 152 of any desired type or construction, including integrally formed traction elements, removable cleat members, or the like.

As shown in FIG. 2H, the midsole component 118 is joined to the outsole component 120 in such a manner so as to trap air or other fluid (e.g., gas) within the recesses 142a, 142b. In this illustrated example structure 104, the midsole component 118 and outsole component 120 join together to form a series of separate and distinct fluid-filled chambers 162a (forefoot) and 162b (heel). If desired, in the structure shown in FIG. 2H, the perimeter area around each individual fluid-filled chamber 162a and 162b may be sealed at the joint between the midsole component 118 and the outsole component 120 so that each individual fluid-filled chamber 162a, 162b is separate and distinct from all other fluid-filled chambers 162a, 162b and these individual chambers are not in fluid communication with one another. As other alternatives, if desired, two or more fluid-filled chambers 162a, 162b may be in fluid communication with one another, but that group of fluid-filled chambers 162a, 162b may be sealed off from some of the other fluid-filled chambers 162a, 162b.

The fluid-filled chambers 162a and 162b trap air (or other gas) therein and function to attenuate ground reaction forces when a person wearing a shoe including this sole structure 104 engages a contact surface (e.g., from landing a step or jump). In this manner, the enclosed (and optionally sealed) fluid-filled chambers 162a, 162b function similar to footwear sole structures including fluid-filled bladders (e.g., NIKE "AIR" type footwear), but the separate envelope for the bladder is not present. Rather, the fluid-filled chambers 162a, 162b for attenuating ground reaction forces are formed directly by the midsole/outsole combination in this example sole structure 104.

The forefoot based fluid-filled chambers 162a can be formed to provide a first impact force attenuation effect at the forefoot region 112 of the sole 104, and the heel based fluid-filled chambers 162b can be formed to have a second impact force attenuation effect at the heel region 116 of the sole 104. The first impact force attenuation effect can be formed different from the second impact force attenuation effect to accommodate for different forces being applied at the forefoot region 112 and the heel region 116 of the sole 104. As some more specific examples, the heel region may be made to provide a softer feel whereas the forefoot region may be made to provide a more responsive feel (e.g., more pronounced rebound energy).

While the fluid-filled chambers 162a and/or 162b may have any desired sizes, shapes, positioning, and relative positioning, as some more specific options, at least some of the fluid-filled chambers 162a, 162b may have a largest or maximum horizontal cross sectional area of 5 in² or less, and in some examples, 3 in² or less. For at least some of the fluid-filled chambers 162a, 162b, this largest or maximum horizontal cross sectional area may be within a range of 0.5 in² to 5 in², or even within a range of 0.5 in² to 3 in² (these horizontal cross sectional area measurements are made with the bottom surface of the outsole component 120 placed on a horizontal surface and the cross section taken along a plane parallel to the horizontal surface). The horizontal cross sectional shapes may be, for example, circular, square, rectangular or diamond shaped, oval, elliptical, etc. As for volumes, at least some of the fluid-filled chambers 162a, 162b may have a volume of less than 4 in³, and in some examples, a volume of less than 2.5 in³ or even less than 2 in³. For at least some of the fluid-filled chambers 162a, 162b, this volume will be within a range of 0.25 in³ to 2.5 in³, or even within a range of 0.5 in³ to 2 in³. The fluid-filled chambers 162a, 162b may be arranged in a sole structure such that at least some portions of adjacent chambers are separated by a distance of less than 0.5 inches or even by a distance of less than 0.375 inches or less than 0.25 inches.

In the example sole structure 104 shown in FIGS. 2A through 2H, in both the forefoot area and the heel area the fluid-filled chambers 162a, 162b (and the recesses 142a, 142b) are arranged to at least partially align in the medial side-to-lateral side direction across the sole structure 104 and in the heel-to-toe direction across the sole structure 104. The terms "heel-to-toe" or "longitudinal" direction, as used in this specification, is a direction determined by a line connecting a rearmost heel (or other) point of an item (e.g., see point P1 of the midsole structure 118 of FIG. 2A) and the forward most toe (or other) point of the item (e.g., see point P2 of the midsole structure 118 of FIG. 2A). If the forward most and/or rearmost locations of a specific item constitute line segments, then the forward most point and/or the rearmost point constitute the mid-point of the corresponding line segment. If the forward most and/or rearmost locations of a specific item constitute two or more separated points or line segments, then the forward most point and/or the rearmost point constitute the mid-point of a line segment connecting the opposite ends of the separated points or line segments. The "medial side-to-lateral side" or "transverse" direction is orthogonal to the longitudinal direction.

In this specific example sole structure 104, the forefoot area includes: (a) three sets of four fluid-filled chambers 162a that at least partially align in the heel-to-toe direction, (b) one set of three fluid-filled chambers 162a that at least partially align in the heel-to-toe direction, (c) three sets of four fluid-filled chambers 162a that at least partially align in the medial side-to-lateral side direction, (d) one set of three fluid-filled chambers 162a that at least partially align in the medial side-to-lateral side direction. Similarly, the heel area of this specific example sole structure 104 includes: (a) two sets of three fluid-filled chambers 162b that at least partially align in the medial side-to-lateral side direction and (b) one set of two fluid-filled chambers 162b that at least partially align in the medial side-to-lateral side direction. The rearmost two fluid-filled chambers 162b in the heel area are staggered with respect to the forward rows of chambers 162b, and thus, each rearmost fluid-filled chamber 162b partially aligns with a left row and a right row of the forward rows of chambers 162b. If desired, the heel area and/or the forefoot area of a sole structure may have from 2 to 10 at least partially aligned fluid-filled chambers in the transverse direction (and in some examples, from 3 to 8 or even from 3 to 6 at least partially aligned chambers). Similarly, the heel area and/or the forefoot area of a sole structure may have from 2 to 10 at least partially aligned fluid-filled chambers in the longitudinal direction (and in some examples, from 3 to 8 or even from 3 to 6 at least partially aligned chambers).

FIG. 2D further shows that at least some of the recesses 142b can be formed with a draft angle A, which is defined between an upper surface 146 and a sidewall 144 forming the recess 142b. Although not labeled in the figures, at least some of the forefoot recesses 142a also can be formed with a draft angle. The draft angle A provides for the optimum impact force attenuation of the user's foot in the sole 104 and provides for a less rigid feel in the sole 104. In particular, the draft angle A provides for dynamic impact force attenuation in the sole 104. By controlling the draft angle A, compression and/or collapse of the recesses 142a, 142b occurs under at least some impact force conditions, and this compression and/or collapse provides impact force attenuation. The desired impact force attenuation characteristics of the sole 104 can be tuned or adjusted by altering the size of the recess and/or the draft angle. In some examples, the draft angle A can be formed in the range of 91° to 135°, and in some examples, in the range from 92° to 125° or even from 95° to 120°. While vertical)(90° walls may be used in some structures according to this invention, such vertical walls will tend to produce a relatively firm feel to that portion of the sole structure 104.

In the sole structure 104 shown in FIGS. 2A through 2H, the recesses 142a, 142b are formed solely in the midsole component 118, and the top surface 120a of the outsole component 120 is substantially smooth (e.g., flat or contoured) and covers the recesses 142a, 142b. Other options are possible.

Figure 3A:
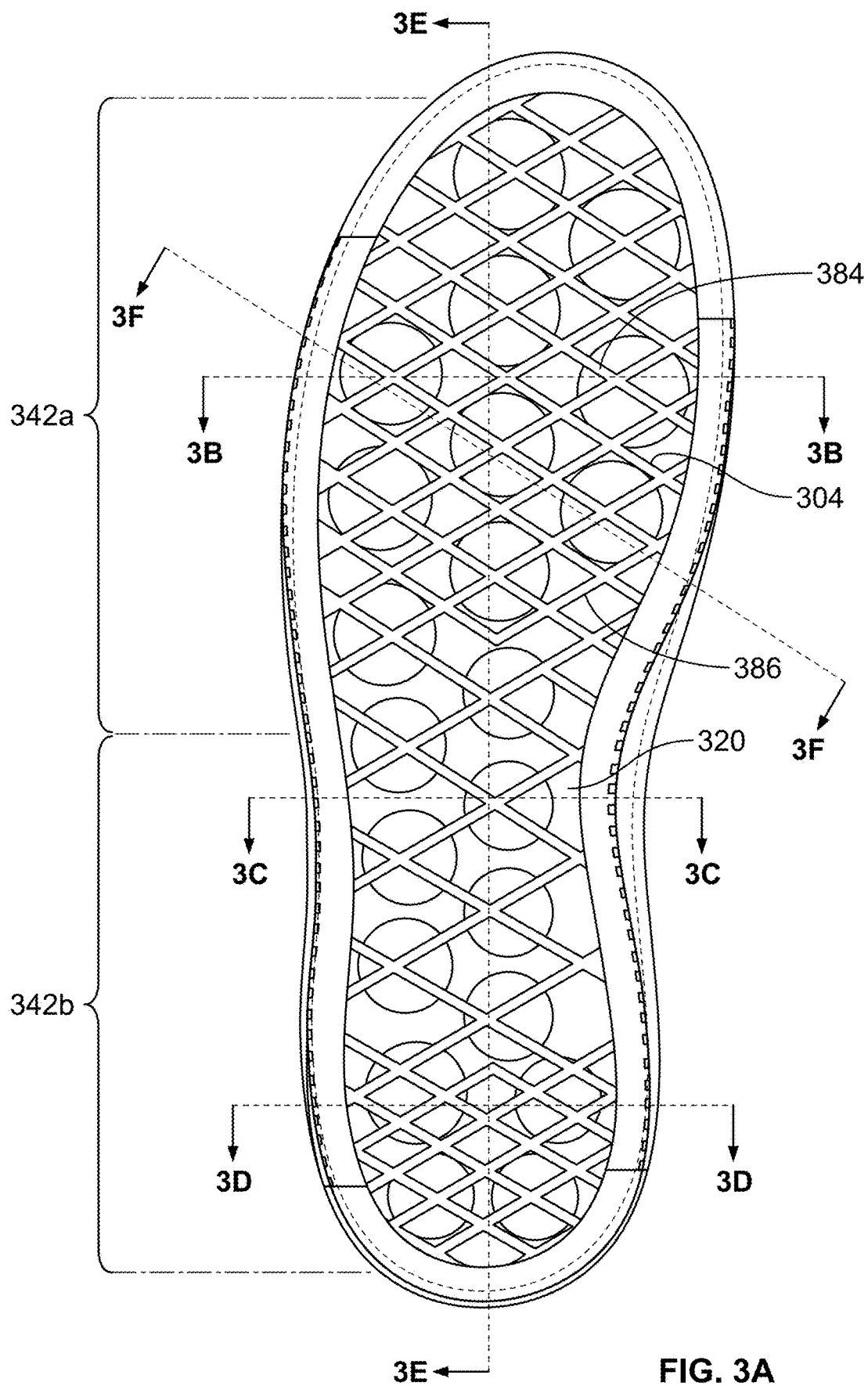
Figure 3B:
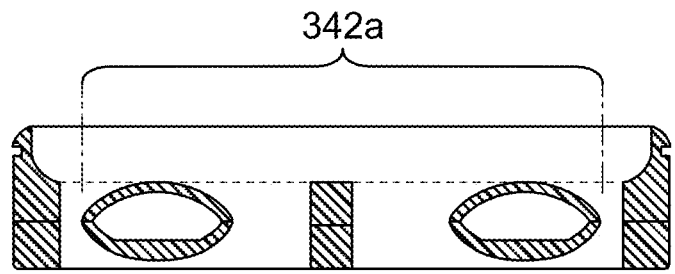
Figure 3C:
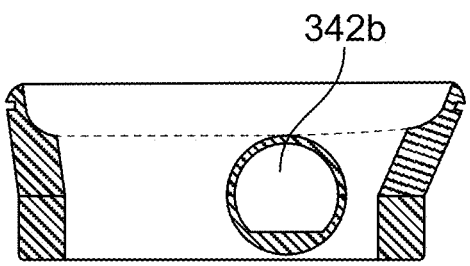
Figure 3D:
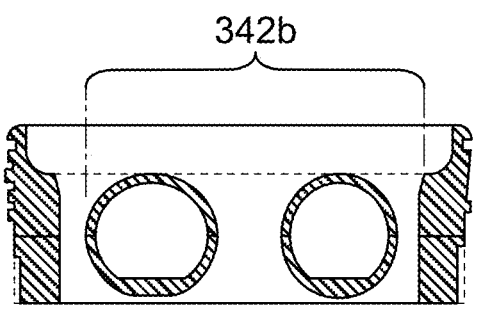
Figure 3G:
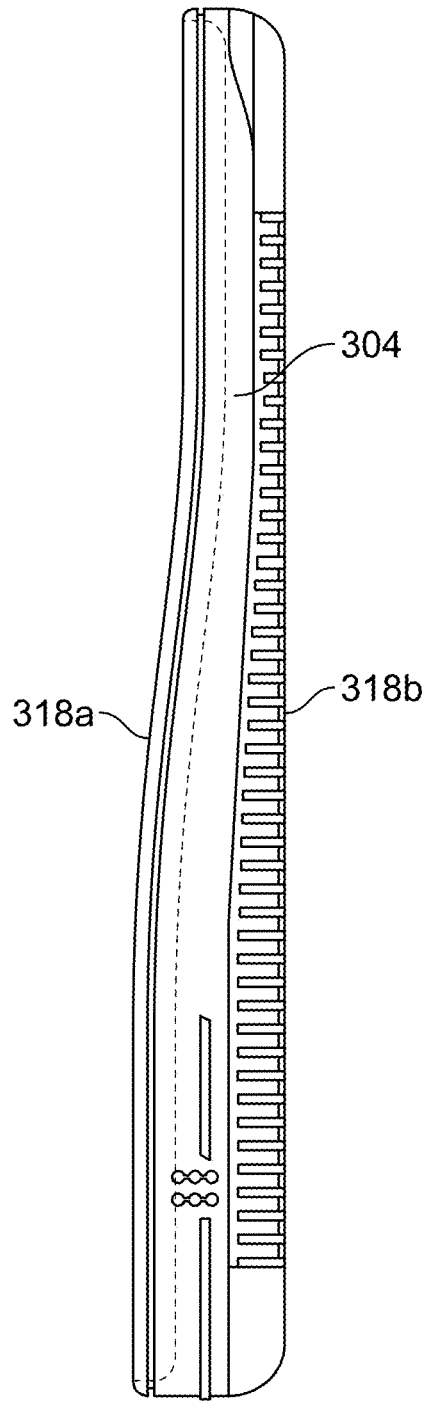
Figure 3H:
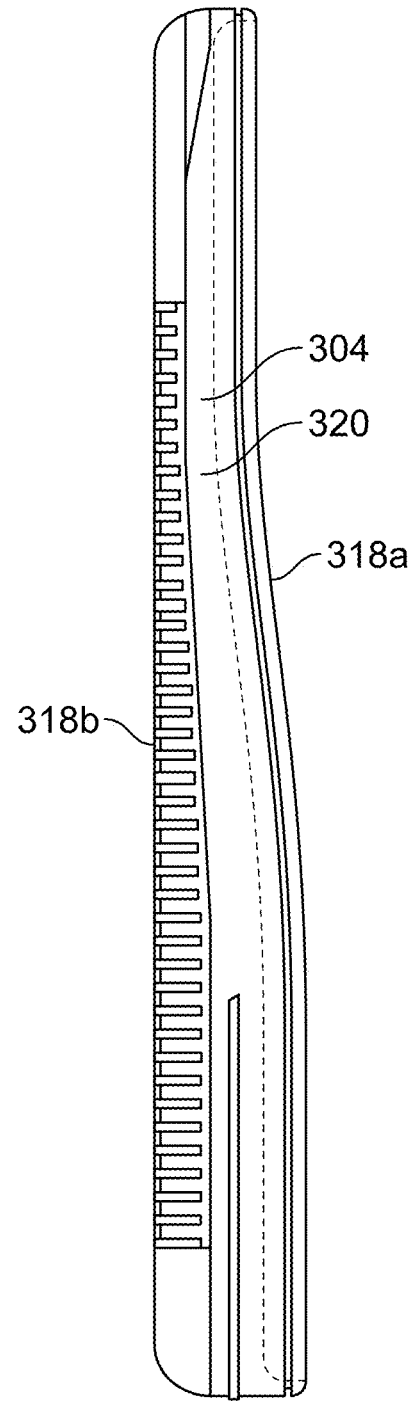

For example, as shown in FIGS. 3A-3K, an outsole 320 may be formed with fluid-filled chambers 342a, 342b, which can be filled with any gas (e.g., air as discussed herein). FIG. 3A shows a top view of the sole structure 304. FIG. 3G shows a left side view, and FIG. 3H shows a right side view of the sole structure 304. FIG. 3B is a cross sectional view of sole structure 304 taken along line B-B in FIG. 3A. FIG. 3C is a cross sectional view of sole structure 304 taken along line C-C in FIG. 3A. FIG. 3D is a cross sectional view of sole structure 304 taken along line D-D in FIG. 3A. FIG. 3E is a cross sectional view of sole structure 304 taken along line E-E in FIG. 3A. FIGS. 3I and 3J are top perspective views of portions of an outsole structure to show the fluid-filled chambers 342a and 342b. FIG. 3K is a partial cutaway view of the outsole through chamber 342b.

The outsole 320 can be formed using two mold halves comprising an upper mold plate half and a lower mold plate half initially separated by a middle plate. The fluid-filled chambers 342a, 342b can be created separately (but optionally in a single molding step and/or apparatus) by separately forming: (a) an upper half of the outsole 320 containing upper recesses for an upper portion of the fluid-filled chambers 342a, 342b using the upper mold plate half and the middle plate and (b) a lower half of the outsole 320 containing lower recesses for the lower portion of the fluid-filled chambers 342a, 342b using the lower mold plate half and the middle plate. Once the top and bottom halves of the chambers 342a, 342b and/or outsole 320 are formed, the full fluid-filled chambers 342a, 342b can be created by removing the middle plate from the mold and pressing the top and bottom halves of the outsole together (e.g., by pressing the upper mold plate half together with the lower mold plate half), optionally while molding in or otherwise forming other features of the outsole structure 320. In particular, the upper mold plate half and the lower mold plate half, both containing the previously formed upper and lower outsole halves, are pressed together and thus trap air or other gas to form the fluid-filled chambers 342a, 342b in the outsole 320. The outsole 320, which includes the integrally formed fluid-filled chambers 342a, 342b, can be formed of rubber, or other suitable material. Alternatively, the fluid-filled chambers 342a, 342b may be formed in the material of the sole structure 304 as a post fabrication step (e.g., cut into the sole material using a drill, laser, or other desired cutting tool or method). As yet another example, if desired, the fluid-filled chambers 342a, 342b may be formed as blind holes in the top surface of the outsole 320 which are then covered (and optionally sealed off) by the bottom surface of the midsole (or other footwear component).

Although not shown, the sole structure 304 can be engaged with an upper, e.g., of any desired construction and in any desired manner, including the various constructions and connections described herein. The sole structure 304 can be made from one or more parts engaged together, e.g., in any of the various manners described herein.

Like the structures illustrated in FIGS. 2A through 2H, the example sole structures 304 shown in FIGS. 3A-3K include fluid-filled chambers 342a, 342b formed in the sole structure 304 in both the forefoot region and the heel region to provide the desired impact force attenuation characteristics. In these illustrated examples, the fluid-filled chambers 342a, 342b have a generally circular or oval-like vertical cross-sectional shape, but other shapes also are contemplated, such as the other shapes described herein with respect to the other embodiments. The fluid-filled chambers 342a, 342b can be formed of different diameters, e.g., depending on the desired impact force attenuation to be provided in the various localized areas of the sole structure 304. The fluid-filled chambers 342a, 342b can also be formed in different constructions, e.g., different wall thicknesses, different recess diameters, different spacing between the fluid-filled chambers 342a, 342b, different gas pressures, etc., to provide different impact force attenuation characteristics in the forefoot region and the heel region. As one more specific example, the fluid-filled chambers 342a, 342b can be formed of different diameters to provide different impact force attenuation properties. For example, larger diameter fluid-filled chambers can give areas of the sole structure 304 a softer feel as compared to smaller diameter fluid-filled chambers.

Accordingly, one main difference between the sole structures 304 of FIGS. 3A through 3K and the example illustrated in FIGS. 2A through 2H relates to the outsole structure 320. While in the example shown in FIGS. 2A through 2H, the recesses 142a, 142b are formed solely in the midsole component 118, in the examples shown in FIGS. 3A through 3K, fluid-filled chambers 342a and 342b are formed solely in the outsole structure 320.

In the structure illustrated in FIGS. 3A through 3H, some of the fluid-filled chambers 342a, 342b are formed as generally spherically shaped. Additionally or alternatively, at least some of the fluid-filled chambers 342a, 342b can be formed ellipsoid or ovoid shaped. As depicted in FIGS. 3A through 3F, in this illustrated example outsole structure 320, the forefoot fluid-filled chambers 342a are formed generally ellipsoid or ovoid shaped, whereas rearfoot fluid-filled chambers 342b are formed generally more spherically shaped.

As shown in FIG. 3A, the interior of the outsole structure 320 can be provided with reinforcing or support ribs 384. The reinforcing ribs 384 can form a diamond pattern along the interior of outsole structure 320. The reinforcing ribs can form pockets 386 that extend to a predetermined depth into the outsole structure 320. Each of the fluid-filled chambers 342a, 342b can be formed integral with and within one or more of the pockets 386 extending into the outsole structure 320 (see also FIGS. 3I and 3J). Additionally, the fluid-filled chambers 342a, 342b can be supported by reinforcing or support ribs 384 arranged in the diamond pattern within the outsole structure 320. Additionally, if desired, the fluid-filled chambers 342a can be arranged in diagonal rows of two or three across the forefoot region, and the fluid-filled chambers 342b can be arranged in diagonal rows of two across the heel and/or midfoot regions. This arrangement may provide the desired level of impact force attenuation for at least some uses. However, other arrangements are possible and are contemplated as within the scope of this invention.

FIGS. 3I-3K show a slightly different arrangement of the fluid-filled chambers 342a, 342b in that the rear heel region is provided with a single fluid-filled chamber 342b. The structure depicted in FIGS. 3I-3K can otherwise be formed in accordance with the example structure shown in FIGS. 3A-3H. FIG. 3I shows a top perspective view of the heel region of this example structure 320, and FIG. 3J shows a top perspective view of the forefoot region of this example sole structure 320. FIG. 3K depicts a cross sectional/cut-away view of the sole structure of FIG. 3I. Like the example shown in FIGS. 3A-3H, as illustrated in FIGS. 3I and 3J, each of the fluid-filled chambers 342a, 342b can be formed integral with and within one or more of the pockets 386.

Figures 12, 12A:
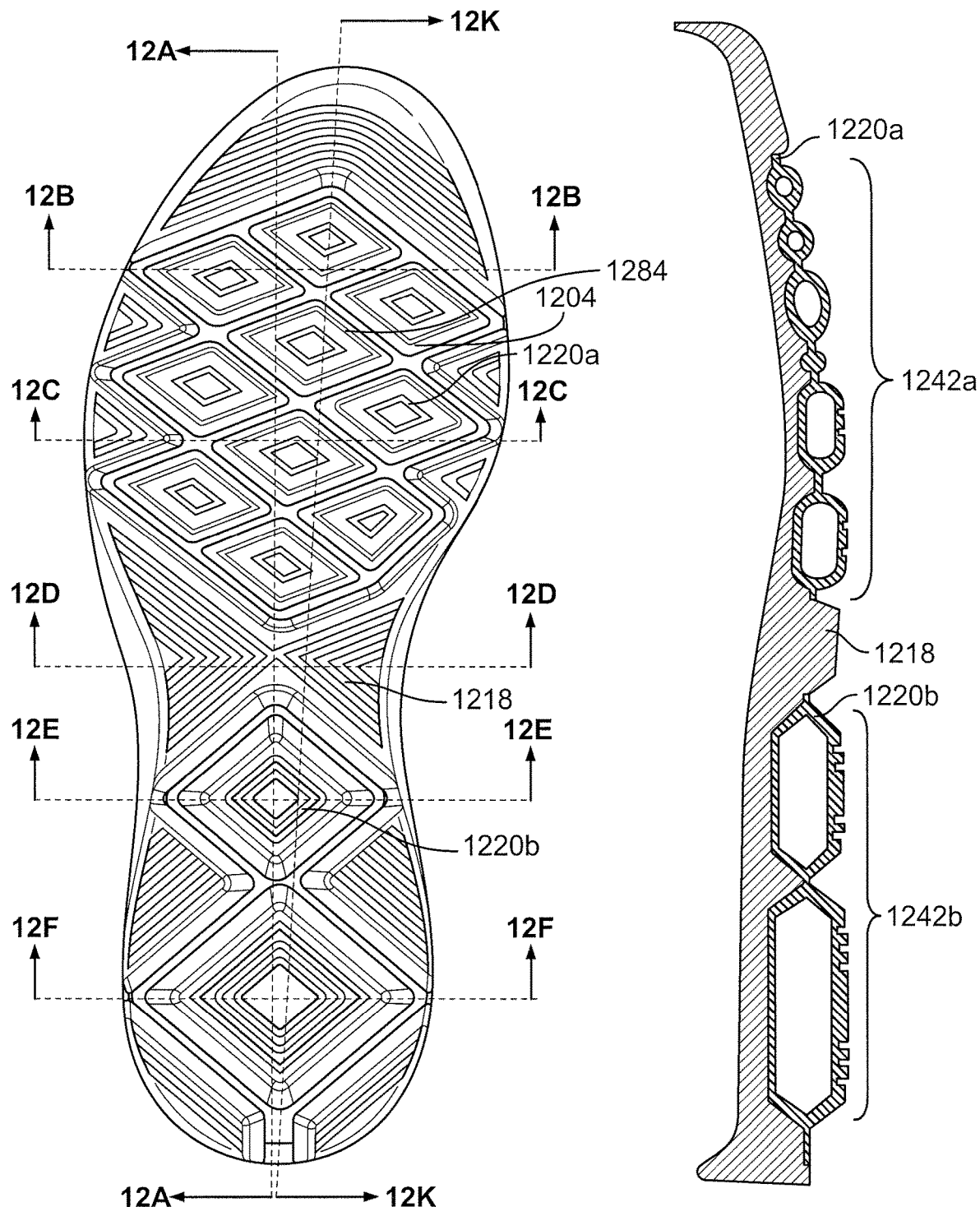
FIGS. 12-12K illustrate an alternative outsole component including fluid-filled chambers in accordance with some examples of this invention.
Figure 12B:
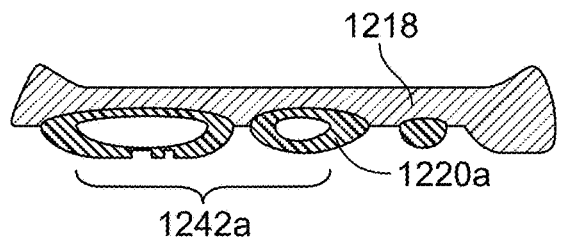
Figure 12C:
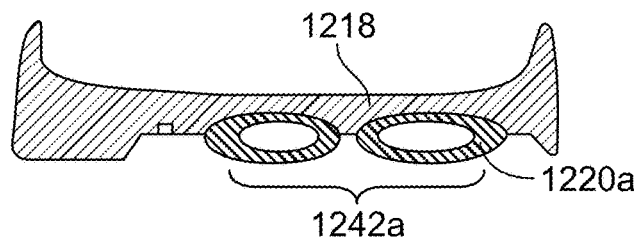
Figure 12D:
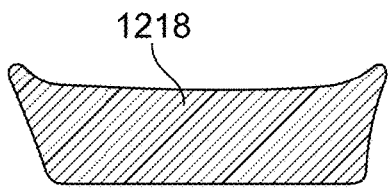
Figure 12E:
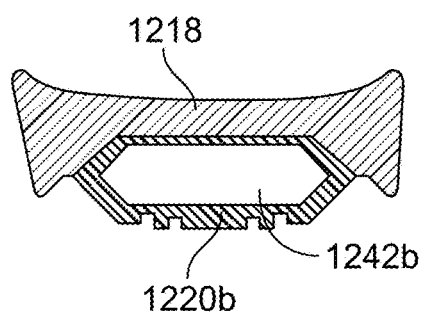
Figure 12F:
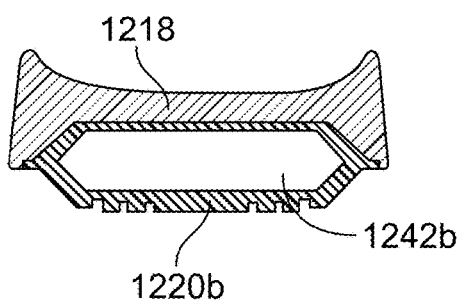

FIGS. 12 through 12K illustrate another example sole structure 1204 for an article of footwear in accordance with some aspects of this invention. Similar to the embodiments shown in FIGS. 3A-3K, the fluid-filled chambers 1242a, 1242b in this example structure are formed in the outsole components 1220a, 1220b. FIG. 12 shows a bottom view of the sole structure 1204, which includes a midsole 1218 and a forefoot outsole component 1220a and a rearfoot outsole component 1220b. FIG. 12G shows a left side view of the sole structure 1204, and FIG. 12H shows a right side view of the sole structure 1204. FIG. 12J depicts a front view of the sole structure 1204, and FIG. 12I depicts a rear view of the sole structure 1204. FIG. 12A is a cross sectional view of the sole structure 1204 taken along line A-A in FIG. 12. FIG. 12B is a cross sectional view of sole structure 1204 taken along line B-B in FIG. 12. FIG. 12C is a cross sectional view of sole structure 1204 taken along line C-C in FIG. 12. FIG. 12D is a cross sectional view of sole structure 1204 taken along line D-D in FIG. 12. FIG. 12E is a cross sectional view of sole structure 1204 taken along line E-E in FIG. 12. FIG. 12F is a cross sectional view of sole structure 1204 taken along line F-F in FIG. 12. FIG. 12K is a cross sectional view of sole structure 1204 taken along line K-K in FIG. 12.

Although not shown, the sole structure 1204 can be engaged with an upper, e.g., of any desired construction and in any desired manner, including the various constructions and connections described herein. The sole structure 1204 can be made from two or more parts engaged together, e.g., in any of the various manners described herein. The sole structure 1204 can be formed with a top surface 1218a and a bottom surface 1218b. As shown in FIGS. 12G-12J, the top surface 1218a can be formed with a contoured surface having heightened portions, e.g., around its edge, to provide a chamber providing additional comfort, support, and protection to the user's foot during use. Also, while the illustrated sole structure 1204 includes two separated fluid-filled chamber structures 1242a, 1242b (on two separate outsole components 1220a, 1220b), any number of fluid-filled chamber structures (and/or outsole components) may be engaged with a midsole 1218 without departing from this invention. Also, multiple fluid-filled chambers within a single outsole component may be in fluid communication with one another or may be sealed off from one another.

Also similar to the example structures shown and described above in conjunction with FIGS. 3A-3K and as illustrated in FIGS. 12A-F and 12K, the sole structure 1204 may be formed with fluid-filled chambers 1242a in the forefoot region and fluid-filled chambers 1242b in the heel region for receiving air or other gas. The fluid-filled chambers 1242a, 1242b can make up the outsole components 1220a, 1220b.

The outsole components 1220a, 1220b and/or the fluid-filled chambers 1242a, 1242b may be formed in any desired manner. For example, the outsole components 1220a, 1220b can be formed using two mold halves comprising an upper mold plate half and a lower mold plate half initially separated by a middle plate. The fluid-filled chambers 1242a, 1242b can be created separately (but optionally in a single molding step and/or apparatus) by separately forming: (a) an upper half of the outsole components 1220a, 1220b including the structure for the fluid-filled chambers 1242a, 1242b using the upper mold plate half and the middle plate and (b) a lower half of the outsole components 1220a, 1220b including the structure for the fluid-filled chambers 1242a, 1242b using the lower mold plate half and the middle plate. Once the top and bottom halves of the outsole components 1220a, 1220b are formed (including the upper and lower halves of chambers 1242a, 1242b), the full fluid-filled chambers 1242a, 1242b can then be created by removing the middle plate from the mold and pressing the top and bottom halves of the outsole components 1220a, 1220b together (by pressing the upper mold plate half together with the lower mold plate half to trap air or other substance within the formed fluid-filled chambers 1242a, 1242b). The outsole components 1220a, 1220b can then be removed from this mold and secured to the separately formed midsole 1218, e.g., within recessed areas or pockets formed on the midsole 1218, for example, using cement or other connection means. The outsole components 1220a, 1220b, which form fluid-filled chambers 1242a, 1242b, can be formed of rubber, or other suitable materials (e.g., conventional outsole material). The midsole 1218 can be formed of a foam material or other suitable materials in a separate production step (e.g., via injection molding, blow molding, compression molding, etc.). Outsole components 1220a and 1220b may be formed in separate molding procedures or in a single molding procedure. Also, if desired, a single mold may be used to make multiple independent outsole components 1220a and/or 1220b.

As another example, outsole components 1220a and/or 1220b may be formed in a thermoforming process. As a more specific example, two sheets of thermoplastic or other suitable (e.g., polymeric) material may be fused together so that the sheets are joined together (e.g., by melting or fusing the sheets together) around the perimeter(s) of the fluid-filled chambers 1242a, 1242b. At least some portions of the sheets are left unbounded to one another within this fuse bonded perimeter. Air or other gas then may be injected into the chambers to inflate them to the desired pressure and the chambers sealed. Spot welding of the sheets or other bonds or interior structures within the chambers (e.g., including tensile elements, etc.) may be used to control the shapes of the chambers.

In contrast to the structures illustrated in FIGS. 2A through 2H, the example sole structure 1204 shown in FIGS. 12A-12F, and 12K includes fluid-filled chambers 1242a, 1242b formed in the outsole structures 1220a, 1220b in both the forefoot region and the heel region to provide the desired impact force attenuation. In the example structure shown in FIGS. 12A-12F, 12K, the fluid-filled chambers 1242a, 1242b formed in the outsole structures 1220a, 1220b, and the corresponding structures of traction elements 1284 are formed diamond shaped along the outsole structures 1220a, 1220b (e.g., during the molding or thermoforming processes described above). As shown in the various cross-sectional views of the outsole structures 1220a, 1220b in FIGS. 12A-12F, and 12K, the fluid-filled chambers 1242a, 1242b can be formed to have different top-to-bottom cross-sectional shapes, including generally oval shaped (e.g., FIGS. 12A, 12B, 12C, and 12K), generally circular shaped (FIGS. 12A, 12K), and generally elongated hexagon shaped (e.g., FIGS. 12A, 12E, 12F, and 12K). Although the cross-sectional shapes of the fluid-filled chambers 1242a, 1242b are depicted generally symmetrical, it is understood that the fluid-filled chambers 1242a, 1242b (as well as the fluid-filled chambers discussed in the other examples disclosed herein) can also be formed asymmetrical and of different shapes. The fluid-filled chambers 1242a, 1242b provide for the requisite impact force attenuation properties.

In this example, the rearfoot fluid-filled chambers 1242b are formed larger than the forefoot fluid-filled chambers 1242a to provide additional impact force attenuation in the heel portion of the outsole structures 1220a, 1220b. However, other shapes, sizes, and/or arrangements of fluid-filled chambers 1242a, 1242b also are contemplated for use without departing from the invention, e.g., including any of the shapes, sizes, and/or arrangements described herein. The fluid-filled chambers 1242a, 1242b in the outsole structures 1220a, 1220b also can be formed with draft angles if desired, e.g., as described above. The fluid-filled chambers 1242a, 1242b can be formed of different sizes and/or inflated to different pressures to provide different impact force attenuation properties. Again, larger sized fluid-filled chambers 1242a, 1242b can give the sole structure 1204 a softer feel.

The traction elements 1284 corresponding to the fluid-filled chambers 1242a, 1242b can form a diamond pattern along the sole structure 1204. Additionally the fluid-filled chambers 1242a can be arranged in diagonal rows of two or three across the forefoot region, and the larger fluid-filled chambers 1242b can be arranged horizontally across the heel region. While this illustrated arrangement may provide a desired level of impact force attenuation for some footwear structures and/or uses, other arrangements are contemplated within the scope of this invention.

Figure 4A:
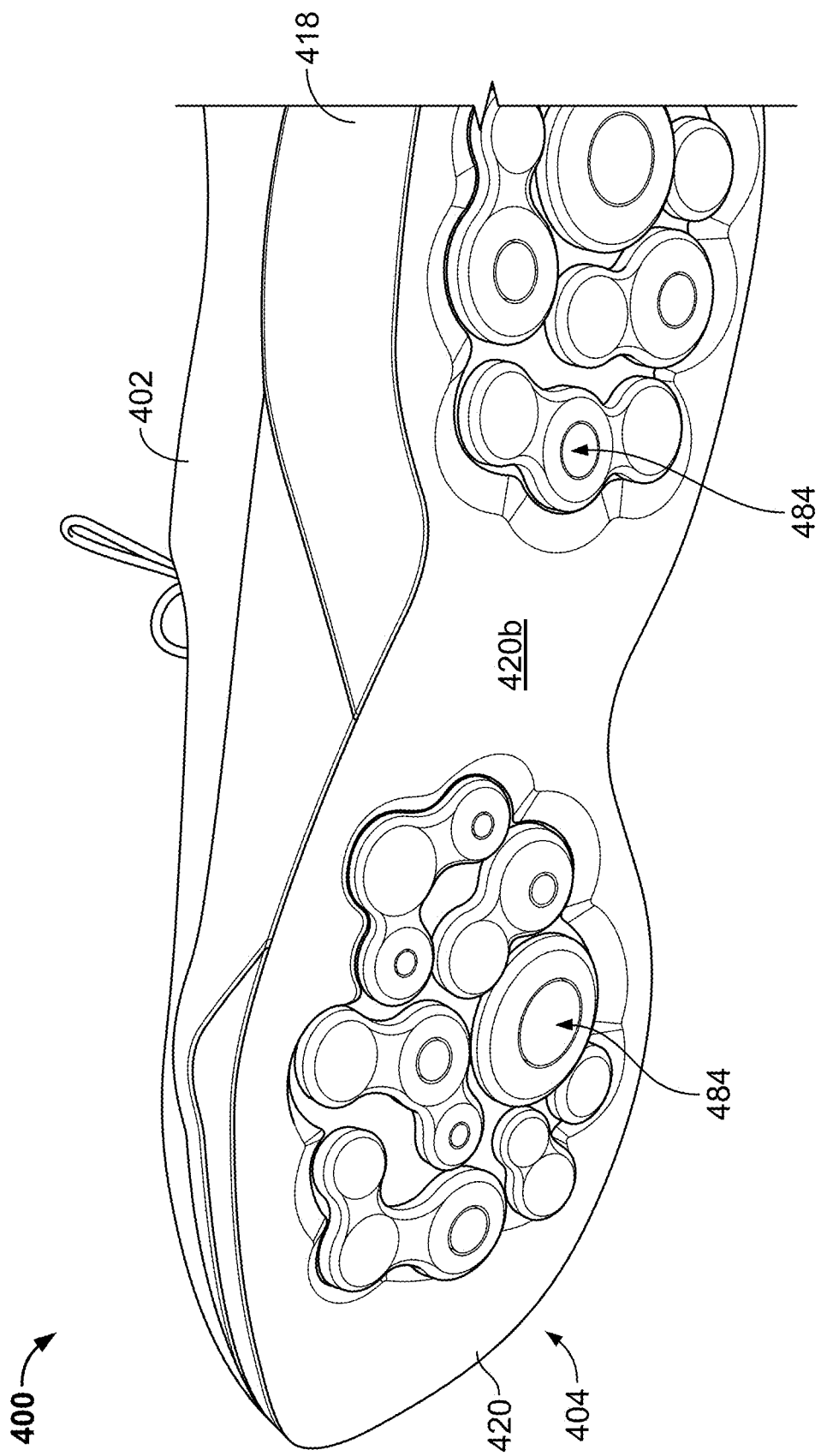
FIGS. 4A through 4H illustrate various views of a sole structure and various component parts thereof in accordance with another example of this invention.
Figure 4B:
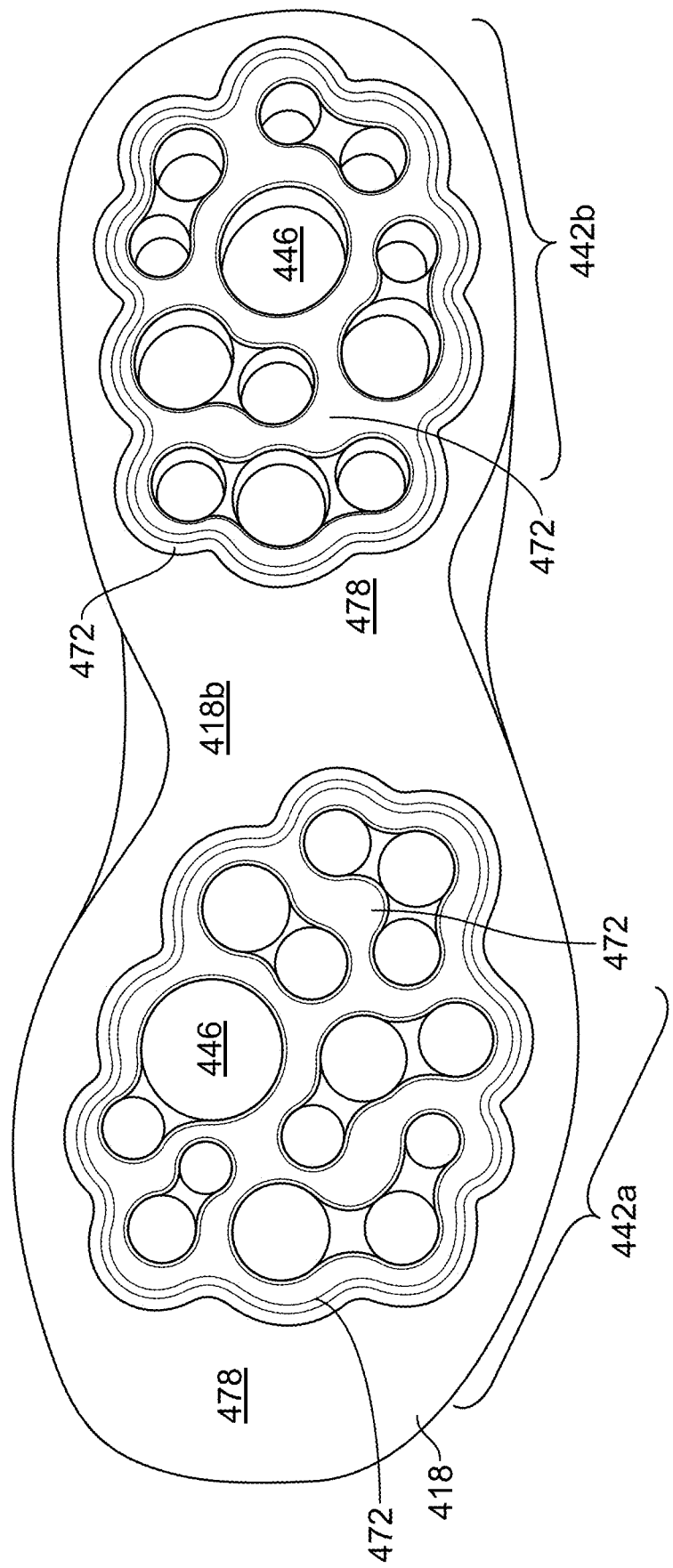
Figure 4C:
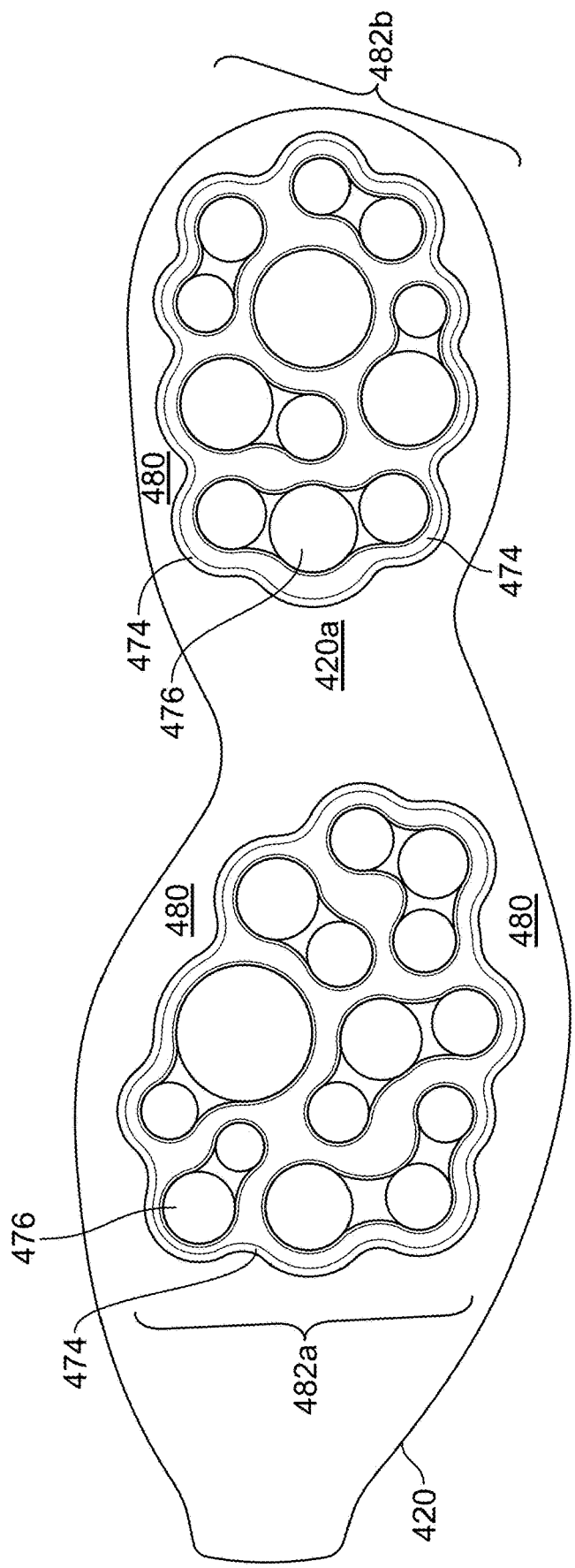
Figure 4D:
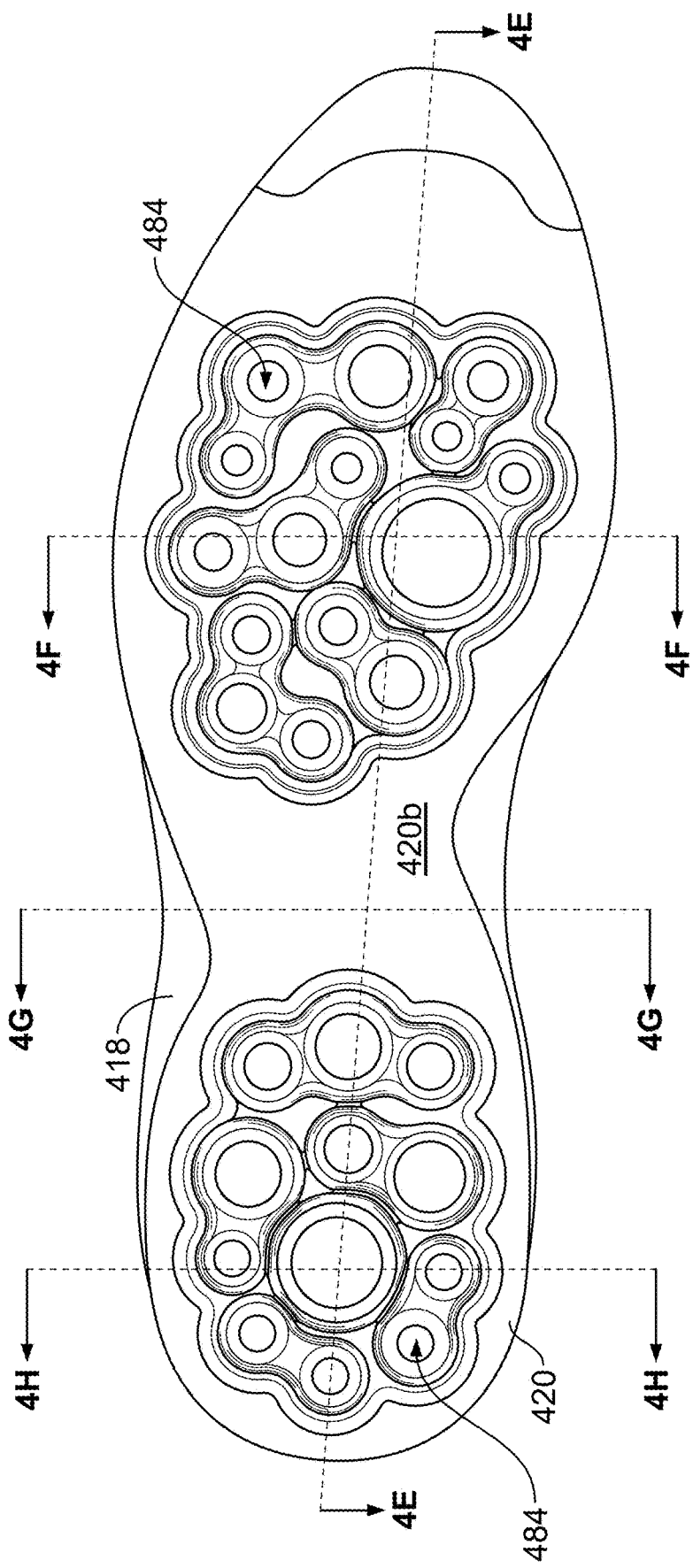
Figure 4E:
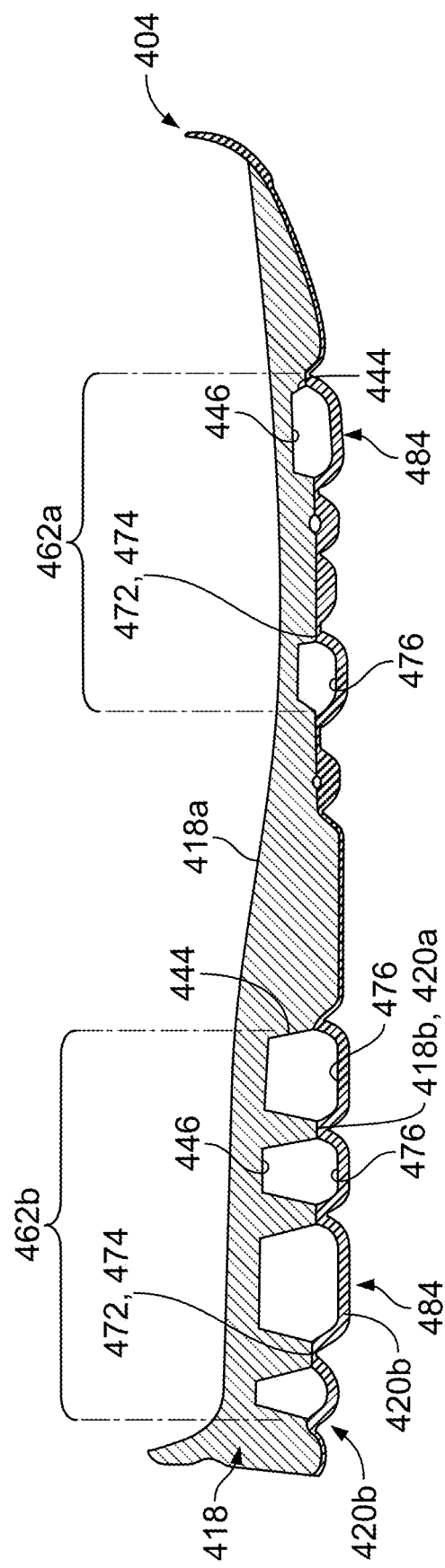
Figure 4F:
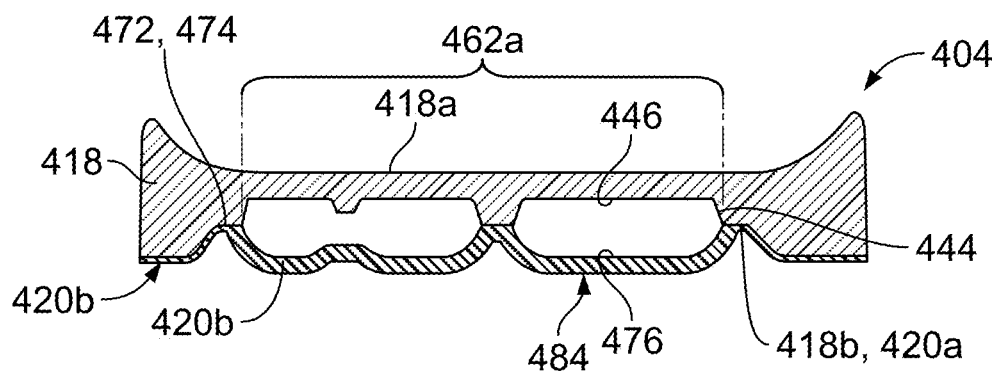
Figure 4G:
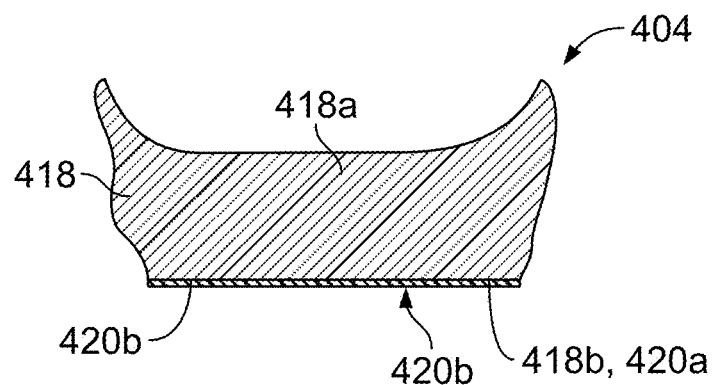
Figure 4H:
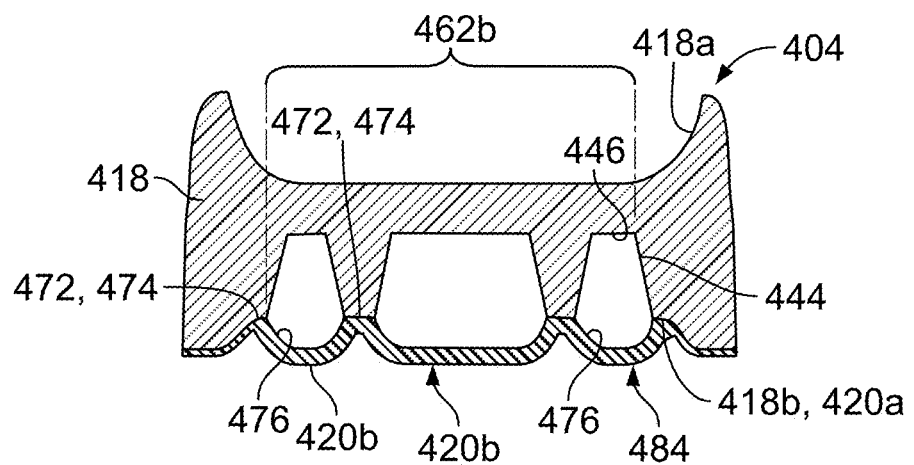

FIGS. 4A through 4H illustrate another example article of footwear 400 and sole structure 404 in accordance with some aspects of this invention. FIG. 4A shows a bottom, lateral side perspective view of the footwear 400. FIG. 4B shows a bottom side view, showing bottom surface 418b, of the midsole component 418 (the top surface of the midsole component 418 may have a relatively smoothly contoured surface for engaging a wearer's foot). FIG. 4C provides a top surface 420a view and FIG. 4D provides a bottom surface view 420b of outsole component 420. FIG. 4E is a cross sectional view of sole structure 404 taken along line E-E in FIG. 4D. FIG. 4F is a cross sectional view of sole structure 404 taken along line F-F in FIG. 4D. FIG. 4G is a cross sectional view of sole structure 404 taken along line G-G in FIG. 4D. FIG. 4H is a cross sectional view of sole structure 404 taken along line H-H in FIG. 4D.

As shown in FIG. 4A, the sole structure 404 is engaged with an upper 402, e.g., of any desired construction and in any desired manner, including the various constructions and connections described above. The sole structure 404 includes a midsole component 418 (made from one or more parts) and an outsole component 420 (made from one or more parts) engaged together, e.g., in any of the various manners described above. Similar to the example structures shown and described above in conjunction with FIGS. 2A through 2H and as illustrated in FIG. 4B, the midsole 418 may be formed with recesses 442a in the forefoot region and recesses 442b in the heel region for receiving air or other gas. These recesses 442a, 442b may be formed in the material of the midsole 418, e.g., during the midsole formation process (e.g., during molding) or as a post fabrication step (e.g., cut into the midsole material using a drill, laser, or other desired cutting tool or method).

In contrast to the structures illustrated in FIGS. 2A through 2H, the example sole structure 404 shown in FIGS. 4A-4H includes recesses 442a, 442b formed in the midsole 418 in different sizes and in different orientations or configurations in both the forefoot region and the heel region to provide the desired impact force attenuation. In this example structure 418, the recesses 442a, 442b have a circular cross-sectional shape, but other shapes also are contemplated, such as the shapes described above. The recesses 442a, 442b can be formed of different diameters, e.g., depending on the desired impact force attenuation to be provided in the various localized areas of the sole structure 404. For example, larger diameter recesses 442a, 442b that provide for more impact force attenuation can be formed in areas where the sole 404 experiences the largest amount of forces in the forefoot region and the heel region. The recesses 442a, 442b also can be formed in different constructions, e.g., to provide different impact force attenuation characteristics in the forefoot region and the heel region. Also similar to the example structures discussed above with respect to FIGS. 2A through 2H, the recesses 442a, 442b can also be formed with draft angles A, which are defined between an upper wall surface 446 and a sidewall 444 forming the recess 442a, 442b. This draft angle can be formed in the ranges of angles described above.

One main difference between the sole structure 404 of FIGS. 4A through 4H and that illustrated in FIGS. 2A through 2H relates to the outsole component 404. While the upper surface 120a of outsole component 120 was relatively flat and/or smoothly contoured, the upper surface 420a of outsole component 420 is shaped to define and form a portion of the interior volumes of fluid-filled chambers 462a, 462b. Some example structures and constructions for fluid-filled chambers 462a, 462b will be described in more detail below in conjunction with FIGS. 4A through 4H.

More specifically, as shown and generally described above, the midsole component 418 includes top surface 418a and bottom surface 418b. The bottom surface 418b of this example midsole component structure 418 includes a plurality of recesses 442a, 442b including one or more interior walls 444 extending in a direction toward the top surface 418a of the midsole component 418. An engagement surface 472 extends around at least a portion of a perimeter of at least some of these recesses 442a, 442b. For at least some of the recesses 442a, 442b, the engagement surface 472 will extend completely around the perimeter of the opening to one or more of the recess 442a, 442b. As shown in the example structure of FIG. 4B, at least some portions of the engagement surfaces 472 may be recessed into the bottom surface 418b of the midsole structure 418 with respect to a base surface level 478 of the midsole component 418. In the structure shown in FIG. 4B, the forefoot recesses 442a are included within a single recessed area with respect to surrounding base surface level 478, and the heel recesses 442b are included within another single recessed area with respect to surrounding base surface level 478.

The outsole component 420 similarly includes a top surface 420a and a bottom surface 420b. In this example structure, the top surface 420a of the outsole component 420 includes: (a) engagement surfaces 474 and (b) one or more interior walls 476 that extend from the engagement surfaces 474 and in a direction toward the bottom surface 420b of the outsole component 420 to thereby form outsole chamber portions 482a (forefoot) and 482b (heel). In the example structure shown in FIG. 4C, at least some portions of the engagement surfaces 474 may project upward from a base surface level 480 of the top surface 420a of the outsole structure 420. In the structure shown in FIG. 4C, a continuous engagement surface 474 projects upward to define forefoot chamber portions 482a and another continuous engagement surface 474 projects upward to define heel chamber portions 482b.

As best shown in FIGS. 4E through 4H, the midsole component 418 and outsole component 420 in this example structure 404 are engaged together such that the various engagement surfaces 472 of the midsole component 418 engage the corresponding engagement surfaces 474 of the outsole component 420 so that the recesses 442a, 442b and the top surface 420a of the outsole component 420 form a plurality of enclosed fluid-filled chambers 462a, 462b. As shown in these figures, one portion of the overall volume of the fluid-filled chambers 462a, 462b in this example structure 404 is formed as part of the midsole construction 418 (recesses 442a, 442b) and another portion of the overall volume of these fluid-filled chambers 462a, 462b is formed as part of the outsole construction 420 (chamber portions 482a, 482b).

The constructions of the engagement surfaces 472, 474 can be used to control and determine the extent of fluid flow (if any) between various portions or individual chambers 462a, 462b within the forefoot or heel part of the sole. For example, if desired, the engagement surfaces 472, 474 could be shaped such that at least some of the individual chambers 462a, 462b within the forefoot or heel part of the sole structure 404 are sealed off from all others and are not in fluid communication with one another. The engagement surfaces 472, 474 may extend around to create a continuous perimeter around one or more individual chambers 462a, 462b to allow fluid communication between any chambers 462a, 462b located within the continuous engagement surface perimeter and to seal off or prevent fluid communication between the chamber(s) 462a, 462b inside that engagement surface perimeter and chamber(s) 462a, 462b located outside that engagement surface perimeter. Individual chambers 462a, 462b within a continuous engagement surface 472, 474 perimeter may be in fluid communication with one another, if desired.

As generally described above with respect to the example sole structure 104 of FIGS. 2A through 2H, the midsole 418 of this sole structure 404 is joined to the outsole 420 to trap air or other fluid within the recesses 442a, 442b to form a series of separate and distinct fluid-filled chambers 462a, 462b. If desired, the sole structure 404 may be constructed to seal a fluid other than air within the chambers 462a, 462b. As a more specific example, if desired, the sole structure 404 (or other sole structures described herein) could be assembled within an environment including a gas other than air (e.g., helium, nitrogen, etc.) to thereby trap that gas within chambers 462a, 462b. As an additional alternative, if desired, the soles 404 may be assembled in an environment having increased air (or other gas) pressure so that the gas trapped and sealed within chambers 462a, 462b is under an elevated pressure. Alternatively, if desired, the gas pressure within at least some of the chambers 462a, 462b may be increased after the sole structure 404 is made, e.g., by increasing the temperature of the sole structure, by injecting additional gas into chambers 462a, 462b, etc.

FIGS. 4A, 4D-4F, and 4H further illustrate that the outside surface 420a of the outsole 420 of this example structure includes tread or traction elements 484 corresponding to the sizes, structures, and locations of at least some of the fluid-filled chambers 462a, 462b.

This feature may help simplify the manufacturing process, e.g., in that the outsole component 420 may be made of a substantially constant thickness and/or via an extrusion technique (optionally shaped after extrusion). The outsole component 420 of this example structure also may be relatively thin and thus lightweight, as compared to thicker, bulkier outsole structures. The locations of the fluid-filled chambers 462a, 462b, as well as their sizes and/or the contour of the exterior surface 420b of the outsole component 420 defining the chambers 462a, 462b, may be selected to provide the desired sizes, shapes, and locations of the traction elements 484.

Figure 5A:
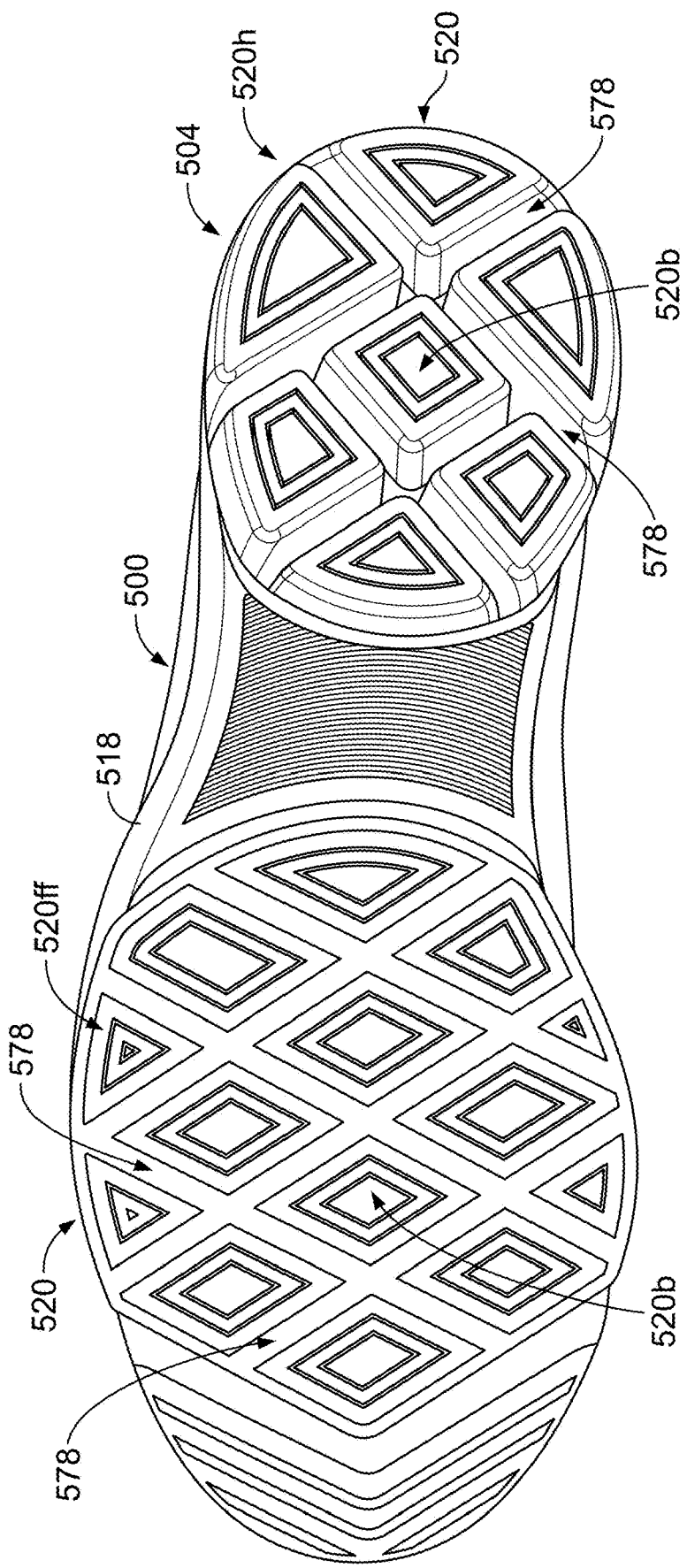
FIGS. 5A and 5B illustrate various views of another example sole structure in accordance with this invention.
Figure 5B:
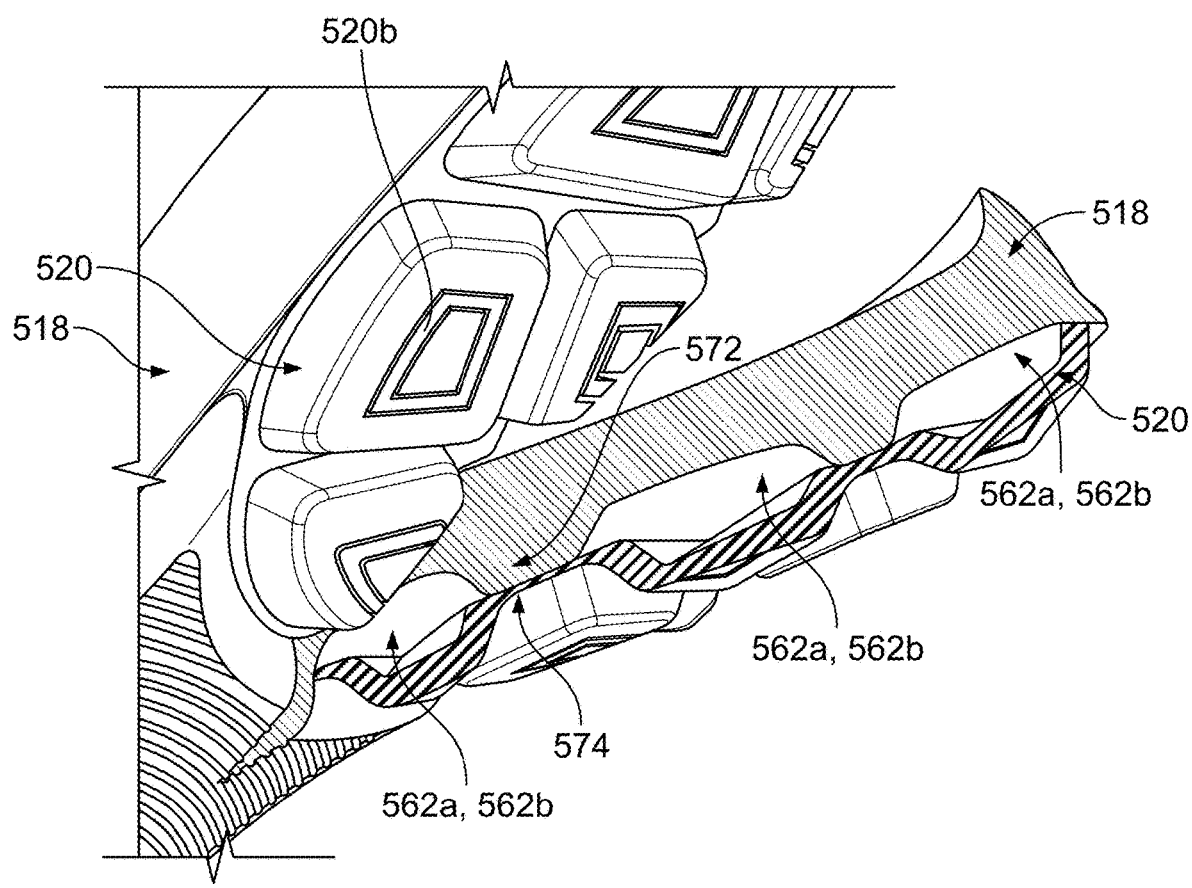

FIGS. 5A and 5B depict another alternative sole structure 504 for an article of footwear 500 in accordance with some aspects of this invention. This sole structure 504 may be formed in a manner similar to sole structure 404 described above (e.g., with engagement surfaces 572 around a perimeter of a midsole recess of midsole component 518 engaging corresponding engagement surfaces 574 around an outsole projection area to thereby form enclosed (and optionally sealed) fluid-filled chambers 562a, 562b). Like sole structure 404 described above, both the midsole 518 and outsole 520 of this sole structure 504 define and contribute volume in forming the fluid-filled chambers 562a, 562b.

In the example structure shown in FIGS. 5A and 5B, the recesses formed in the midsole component 518 and the corresponding structures of the outsole component 520 are formed diamond shaped to provide for the requisite impact force attenuation. However, other shapes also are contemplated for use without departing from the invention, e.g., including any of the shapes described above. The recesses in the midsole component also can be formed with draft angles if desired, e.g., as described above.

Similar to the various structures described above, the recesses are formed open in the lower midsole surface to trap air or other fluid between the midsole 518 and the outsole 520 (optionally pressurized, as described above). Additionally, the engagement surfaces 574 of outsole 520 can correspond to recesses 578 in the bottom surface 520b of the outsole component 520. The recesses 578 between adjacent fluid-filled chambers 562a, 562b may provide lines of flexion and enhanced flexibility to the overall sole structure 504. While shown regularly spaced in the example structure of FIGS. 5A and 5B, if desired, the fluid-filled chambers 562a, 562b may be shaped and spaced apart so that the recesses 578 between the chambers form lines of flexion to support natural motion and flexion to the sole structure 504 (e.g., so that the flex lines of the sole structure 504 better correspond to the natural flexion lines of a foot during active movement). If desired, the recesses 578 may be provided at locations corresponding to at least some of the longitudinal and/or transverse grooves or sipes formed in natural motion footwear sole structures, e.g., NIKE "FREE" type footwear and/or footwear of the type illustrated in U.S. Pat. No. 7,171,767, which patent is entirely incorporated herein by reference.

Additionally, the example sole structure 504 shown in FIGS. 5A and 5B includes two separate and distinct outsole parts 520FF and 520H engaged with a single, continuous midsole component 518. This feature leaves a portion of the midsole component 518 exposed in the arch area of the sole structure 504 between the heel outsole part 520H and the forefoot outsole part 520FF. If necessary or desired, this exposed midsole portion at the bottom of the sole structure 504 may be at least partially covered, e.g., with a carbon fiber or plastic arch support plate, etc.

Figure 6A:
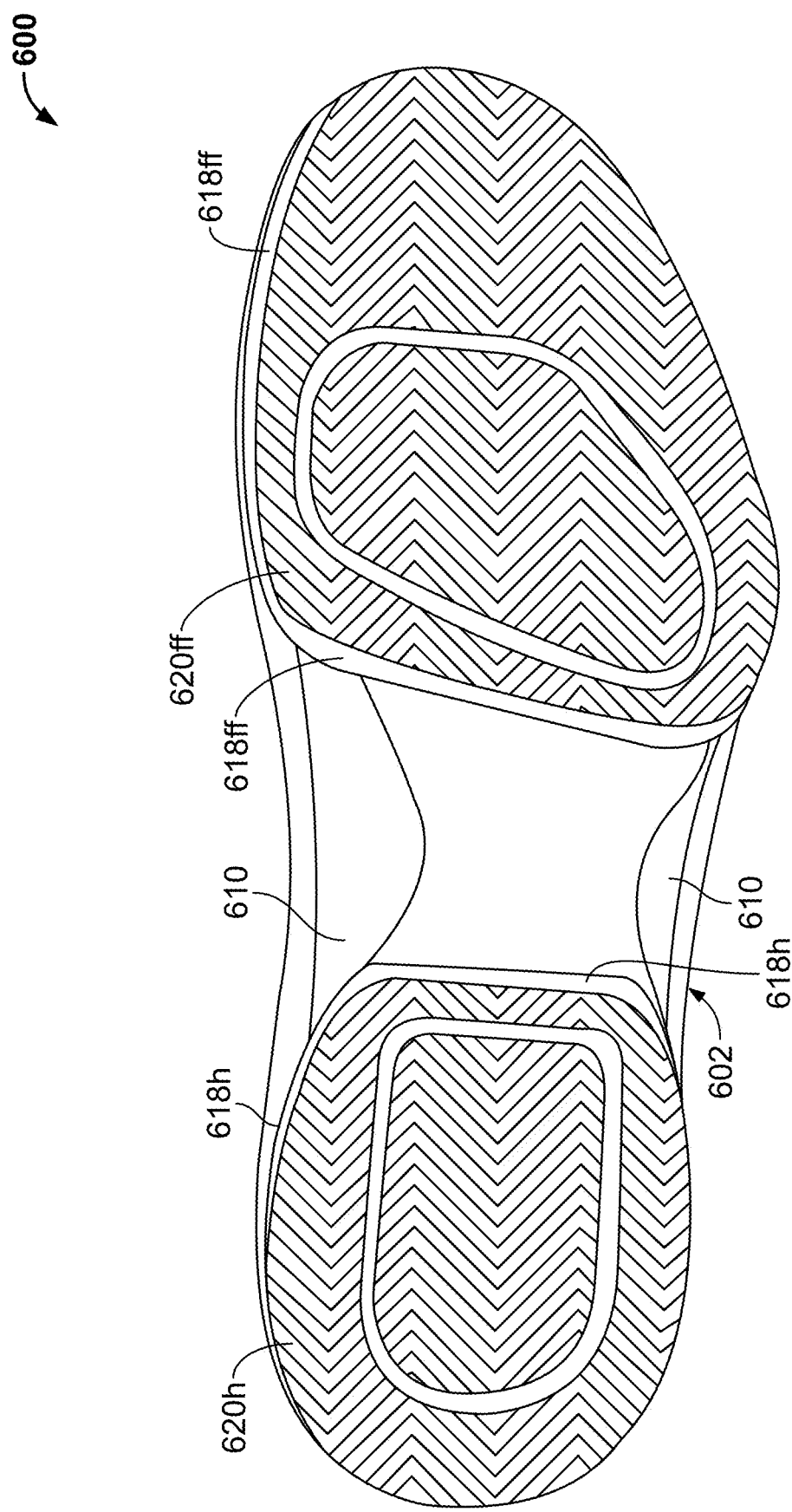
FIGS. 6A and 6B illustrate various views of another example sole structure in accordance with this invention.
Figure 6B:
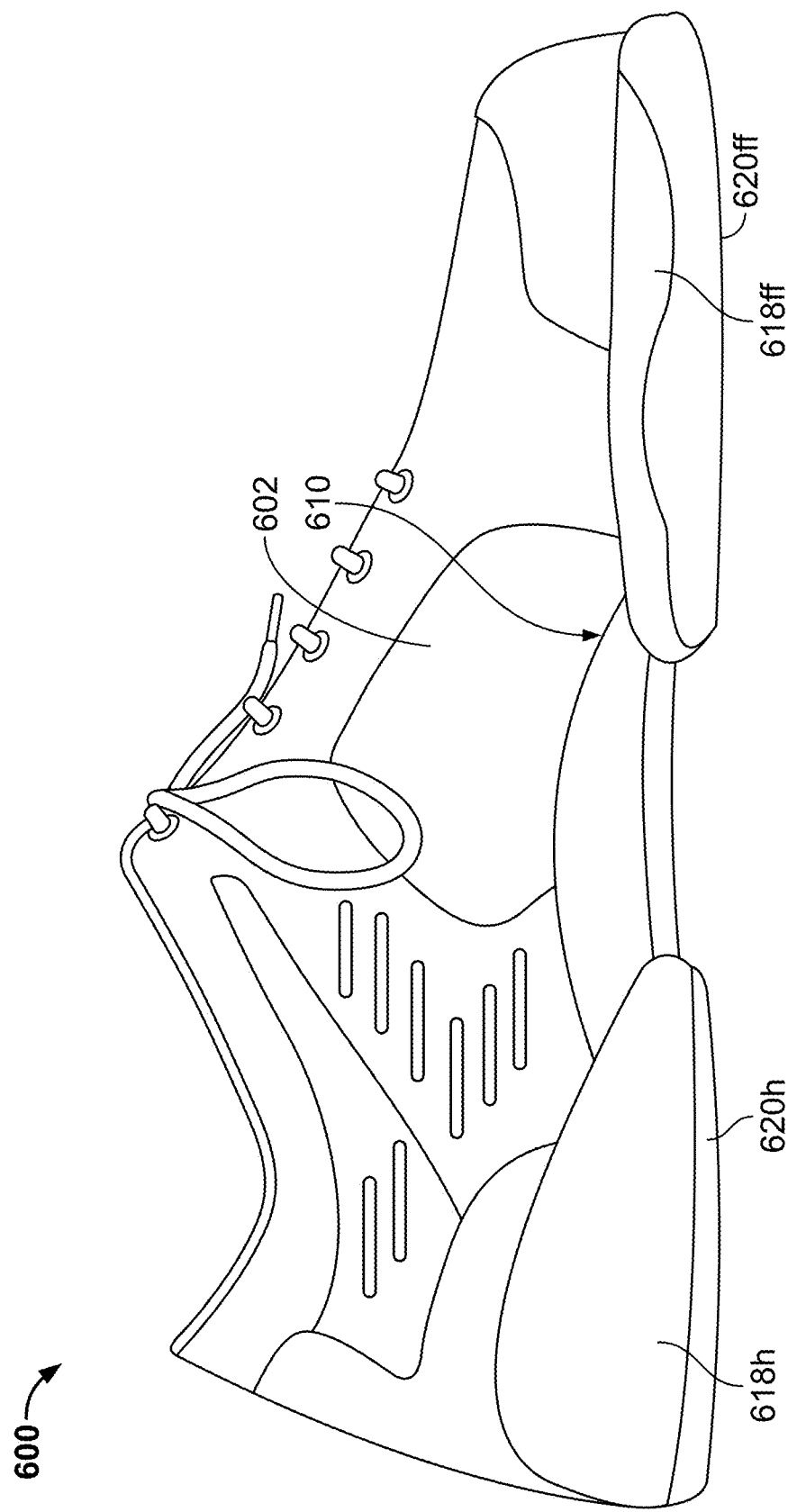

FIGS. 6A and 6B illustrate another example footwear structure 600 that may include fluid-filled chambers in a manner similar to the various structures described above. In this example structure, however, the sole structure (which is engaged with upper 602) includes separate heel midsole components 618H and forefoot midsole components 618FF. These midsole components 618H, 618FF are at least partially covered by separate heel outsole components 620H and forefoot outsole components 620FF. The heel and forefoot outsole components may be separated from one another in the arch area of the sole structure, which may constitute a carbon fiber or plastic arch support member 610. Fluid-filled chambers may be formed between the heel midsole component 618H and the heel outsole component 620H, e.g., in any of the manners described above. Additionally or alternatively, fluid-filled chambers may be formed between the forefoot midsole component 618FF and the forefoot outsole component 620FF, e.g., in any of the manners described above.

Figure 7A:
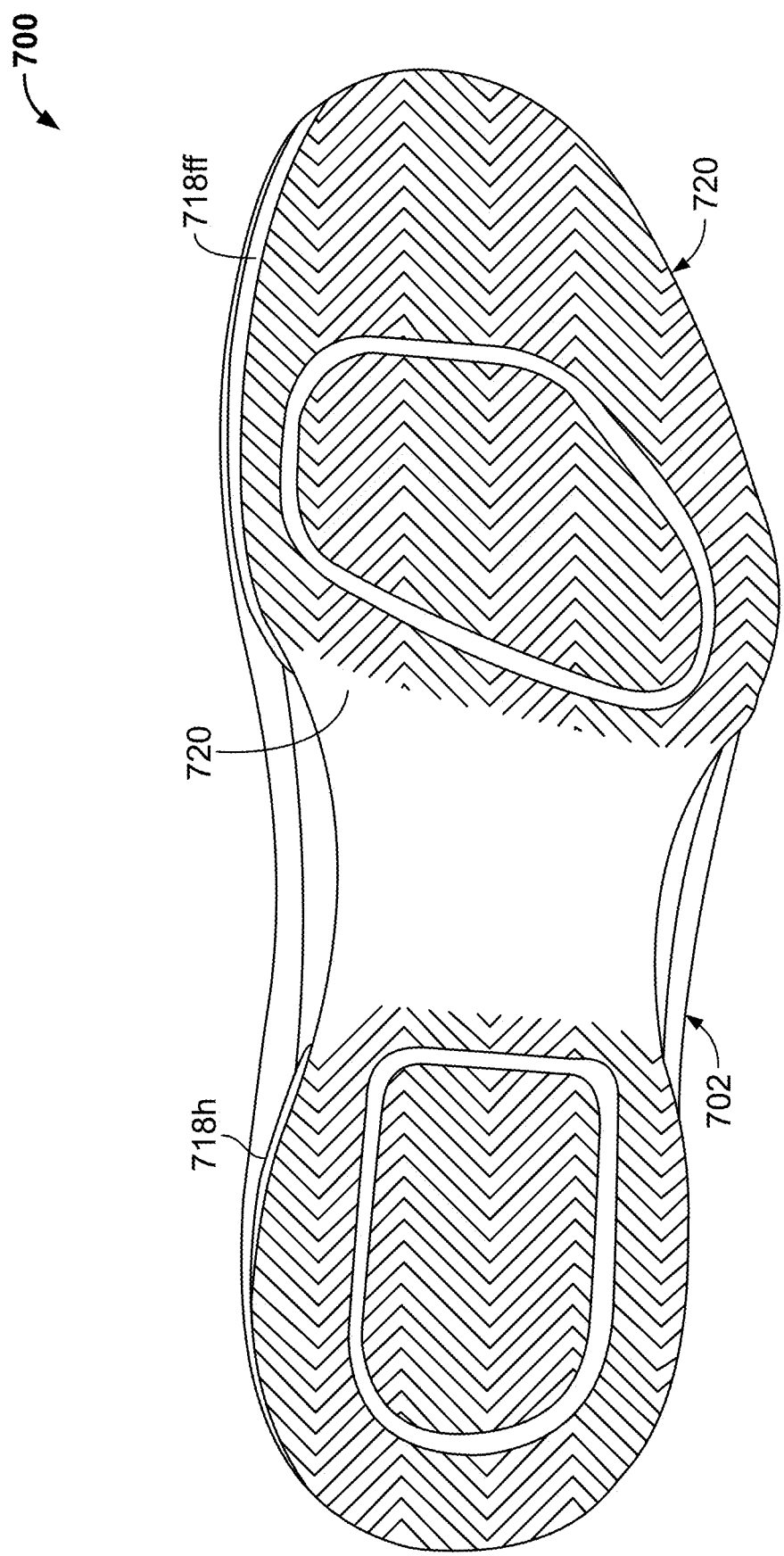
FIGS. 7A and 7B illustrate various views of another example sole structure in accordance with this invention.
Figure 7B:
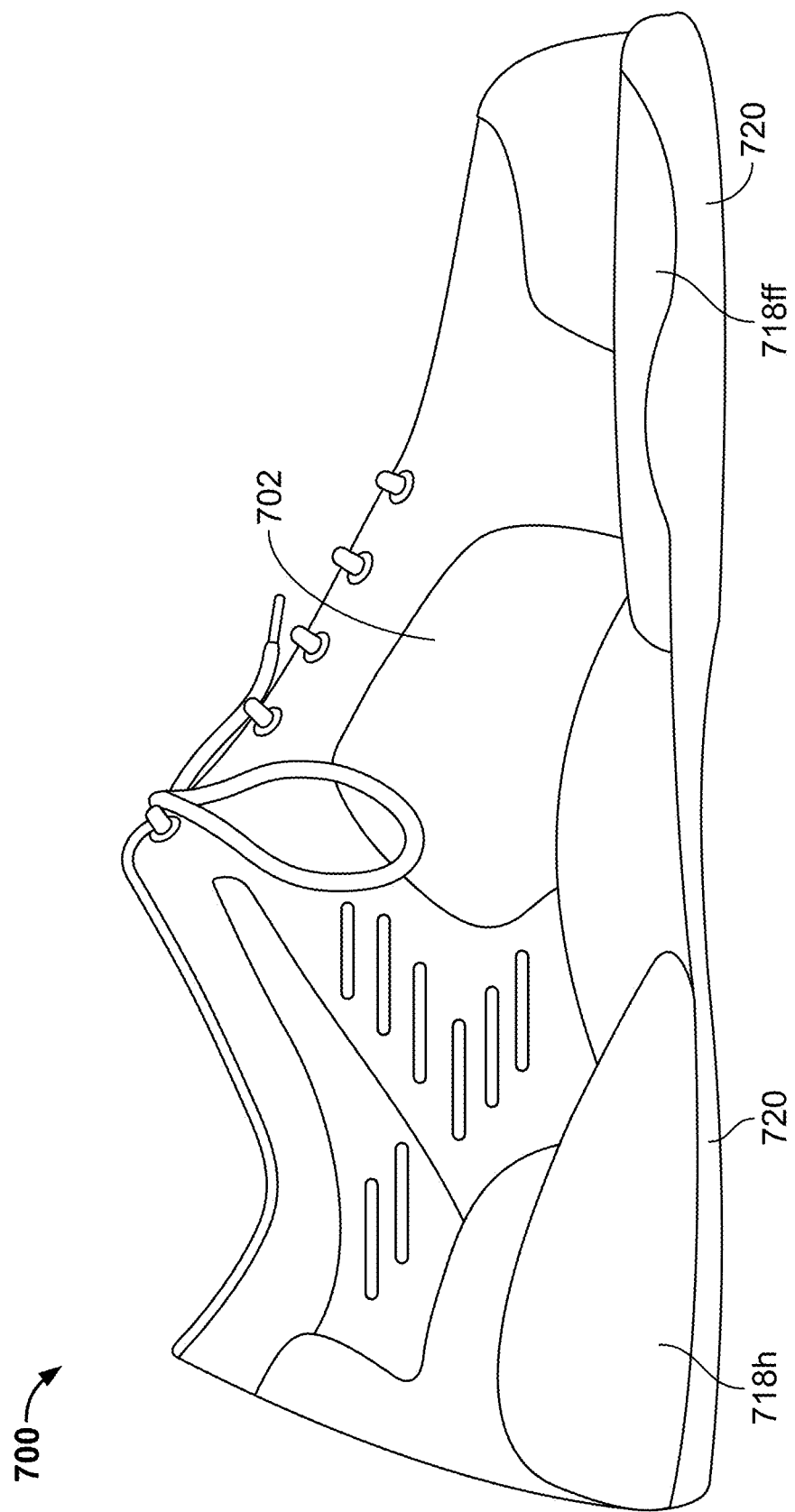

Another alternative footwear construction 700 is shown in FIGS. 7A and 7B. In this example structure 700, the sole structure (which is engaged with upper 702) includes separate heel and forefoot midsole components (718H and 718FF, respectively). These separate midsole components 718H, 718FF are engaged with a single outsole component 720. If necessary or desired, additional structures may be included in the sole structure, e.g., such as an arch support portion (e.g., made from carbon fiber, plastic, etc.) located between heel midsole component 718H and forefoot midsole component 718FF. Fluid-filled chambers may be formed between the heel midsole component 718H and the outsole component 720, e.g., in any of the manners described above. Additionally or alternatively, fluid-filled chambers may be formed between the forefoot midsole component 718FF and the outsole component 720, e.g., in any of the manners described above.

In the example structures described above, the engagement surfaces of the midsole components and the outsole components (e.g., around the perimeter of the recesses or other structures that at least partially define the fluid-filled chambers) are relatively smooth (and are engaged together, for example, by cements or adhesives, optionally in a sealed manner). Other engagement surface structures are possible without departing from this invention. FIG. 8 illustrates a cross sectional view of an example fluid-filled chamber 862, e.g., of the various types described above, formed by joining a midsole component 818 (including a recess) with an outsole component 820 (that optionally also includes a recess or other structure to contribute to the volume of the fluid-filled chamber 862).

Like the structures described above in conjunction with FIGS. 4A through 4H, around the perimeter of the midsole recess, the midsole component 818 of FIG. 8 includes an engagement surface 872, and the outsole component 820 includes a corresponding engagement surface 874. In this illustrated structure, the engagement surface 874 of the outsole component 820 includes a projecting tongue component 874a extending around at least a portion of the perimeter of the fluid-filled chamber 862. This projecting tongue component 874a fits within and engages a groove component 872a defined in the engagement surface 872 of the midsole component 818. Optionally, if desired, the projection tongue component 874a and the corresponding receiving groove 872a may be formed so as to extend completely around the perimeter of the fluid-filled chamber 862 (or around the perimeter of plural fluid-filled chambers 862).

This tongue-and-groove type structure may help provide improved and more secure engagement between the midsole component 818 and the outsole component 820, e.g., by providing additional surface area for bonding and by making it more difficult to separate the component parts (e.g., helps "lock" them together). The tongue-and-groove components 872a, 874a also can help hold the various components together during assembly of the sole structure and during use (e.g., to provide more secure engagement to separation when shear forces are applied to the sole structure, such as when a user makes a cut or a quick turn action). Additionally, the tongue-and-groove structure can help provide and maintain sealed fluid-filled chambers 862.

Rather than extending continuously and completely around a perimeter area of one or more fluid-filled chambers 862, if desired, at least the tongue member 874a (and optionally also the groove member 872a) may be provided in multiple separate parts around the perimeter area (e.g., as a discontinuous tongue or groove member).

FIG. 9 shows an alternative tongue-and-groove type connection arrangement between a midsole component 918 and an outsole component 920 in which the midsole component 918 includes the tongue component 972a and the outsole component 920 includes the groove component 974a. The tongue-and-groove structure may be provided around all or at least a portion of a perimeter of one or more fluid-filled chambers 962, e.g., as described above in conjunction with FIG. 8.

The term "tongue-and-groove" structure or component, as used herein, includes engagements in which one component includes a rounded groove that partially wraps around a rounded projection or rim on the other component.

If desired, these types of tongue-and-groove structures as illustrated in FIGS. 8 and 9 may be utilized with any of the various midsole and outsole components and assemblies described above. Also, if desired, all of the fluid-filled chambers formed in a given sole structure may include this type of tongue-and-groove arrangement around each fluid-filled chamber. This is not a requirement. Rather, if desired, fewer than all of the fluid-filled chambers in a given sole structure may utilize this type of tongue-and-groove structure. Also, if desired, some fluid-filled chambers of a given sole structure may have some tongue-and-groove structures like those shown in FIG. 8 while other fluid-filled chambers on the same sole structure may have tongue-and-groove structures like those shown in FIG. 9. Any combinations of tongue-and-groove type structures and/or other engagement surfaces may be used on a given sole structure without departing from this invention.

Additional aspects of this invention relate to systems and methods for designing sole structures that include fluid-filled chambers of the types described above. By changing various features of the recesses and/or the fluid-filled chambers in the sole structures, the impact force attenuation properties of a sole structure can be altered and controlled to provide a desired degree of impact force attenuation, softness, responsiveness, and/or other "feel" properties for the sole structure. Some examples are described below.

Not all users have the same needs or preferences for a sole structure. As some examples, the weight of a person may impact the necessary properties of a sole structure, as may characteristics of the person's step (e.g., the extent of pronation or supination during a step cycle). Additionally, athletes may have different footwear support and impact force attenuation needs depending on the position that they play. As some more specific examples, football linemen may need more support in different areas of a sole structure as compared to running backs, who may wish to have as light and/or responsive of a sole as possible (shoe weight may be a less critical factor for linemen). A running back also may have different support and impact force attenuation requirements than a defensive back or linebacker, who may backpedal and run backward with more frequency. A quarterback may have yet different needs, e.g., to provide support for dropping back, setting the feet, and throwing a pass. Different requirements for support and sole weight features are applicable to other sports and athletic activities as well.

Figure 10:
FIG. 10 illustrates example foot pressure force data that may be used in designing midsole and/or outsole components in accordance with some example aspects of this invention.

Therefore, some additional aspects of this invention relate to determining a pattern and other features of midsole recesses and/or fluid-filled chambers in an article of footwear (e.g., formed in a midsole and/or outsole component) to better suit the individual needs of a person and/or to better suit the needs of those that participate in certain types of events. Methods of designing individually customized (or group customized) sole structures for articles of footwear may include, as a first step, obtaining two-dimensional foot pressure data relating to contact force of a foot (optionally when barefoot or without a shoe on) with a contact surface. One example of such foot pressure data is shown in FIG. 10 as a two dimensional presentation 1002 of a foot where color or gray scaling provides information regarding the contact force or pressure on the areas of the foot. Equipment for measuring foot pressure in this manner is known and commercially available.

Foot pressure data of this type may be obtained, for example, when a person is stationary or standing, or alternatively, when a person is moving (e.g., walking, running, backpedalling, sidestepping (or running sideways), landing a jump, initiating a jump, turning, cutting or making a quick direction change, etc.). If possible, foot pressure data may be obtained when the user is involved in activities that cause the most extreme forces on the foot.

Based on the foot pressure data (optionally during one or more of the activities described above), a manufacturer or designer can design a midsole and/or outsole construction that best suits the individual's needs. Many variations in the design of the sole structure are possible, and these variations may change the impact force attenuation properties and/or responsiveness (e.g., rebound force) of that sole structure. For example, the number of recesses, the recess locations in the two dimensional surface space of the sole structure (e.g., in the midsole), the relative positioning of the recesses with respect to one another, and/or fluid pressure within the recesses may be controlled to control or alter impact force attenuation properties. Additionally, the sizes of the recesses and other features thereof may be controlled to control impact force attenuation properties of a midsole. As some more specific examples, one or more of the recess horizontal cross sectional area, recess horizontal cross sectional shape, recess height, recess volume, recess draft angle, and the like may be controlled to control the impact force attenuation properties of a midsole.

Figure 11A:
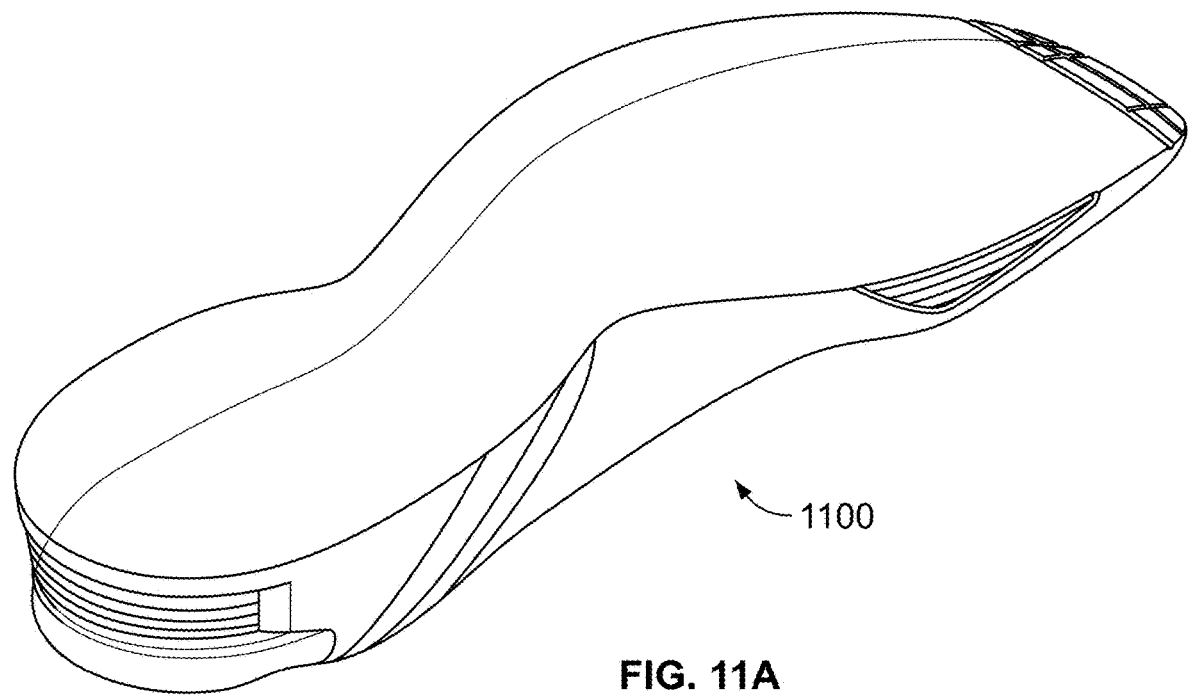
FIGS. 11A through 11D illustrate views of various midsole component designs that may be created by design methods in accordance with some examples of this invention.
Figure 11B:
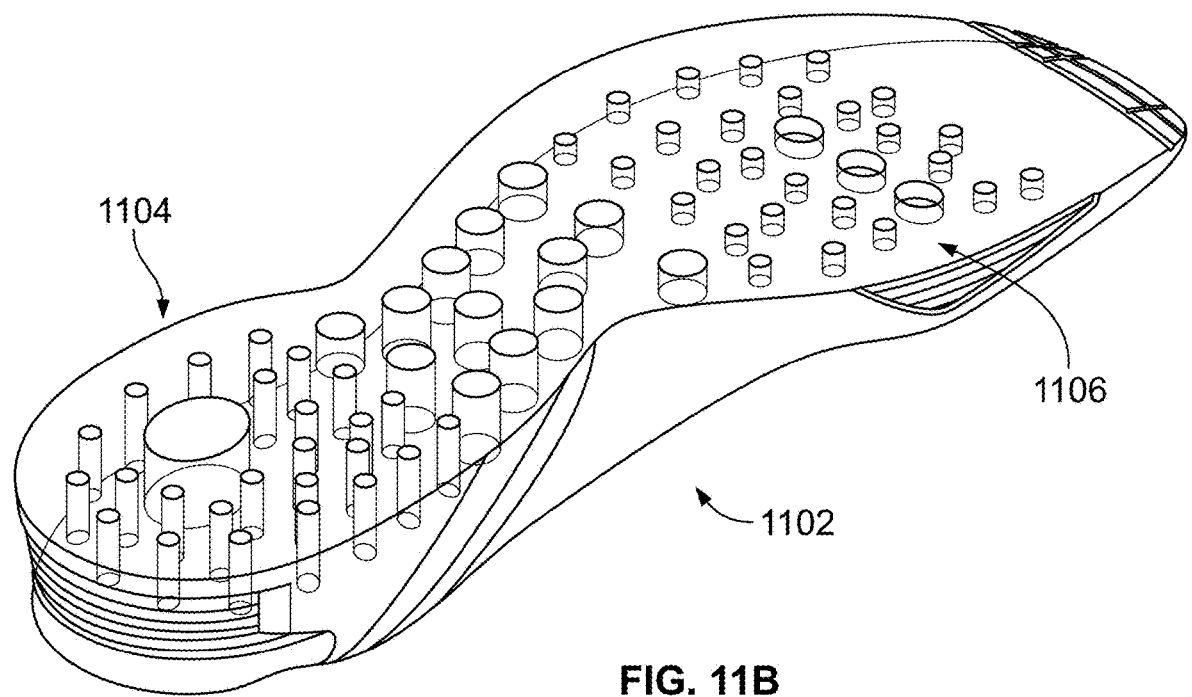

Once the foot pressure data is obtained, a midsole component (or outsole component) including the design of the recessed areas can be determined, optionally taking into further account other features of the user (such as the activity to be performed, the position played, personal preference, a desired sole weight v. support tradeoff, etc.). FIG. 11A shows a computer rendering of a foam midsole blank 1100 that may form the basis or starting point of a midsole design. Based on at least some of the input described above, a footwear designer may develop a pattern of recesses on a bottom surface of the midsole blank to meet the user's support, impact force attenuation, and footwear weight needs. FIG. 11B shows an example midsole design 1102 in which recesses are dispersed around most of the bottom of the midsole structure, with a large recess 1104 provided in the heel area and a set of three relatively large recesses 1106 provided in the forefoot metatarsal head support area. This midsole recess design 1102 may be useful (and optimum) for one type or class of player and/or a player having one set of use desires or requirements. The midsole design 1102 of FIG. 11B would have reduced weight as compared to the midsole blank 1100 of FIG. 11A, and due to the presence of the recesses, the impact force attenuation properties and feel of the midsole design 1102 would differ from that of FIG. 11A.

Figure 11C:
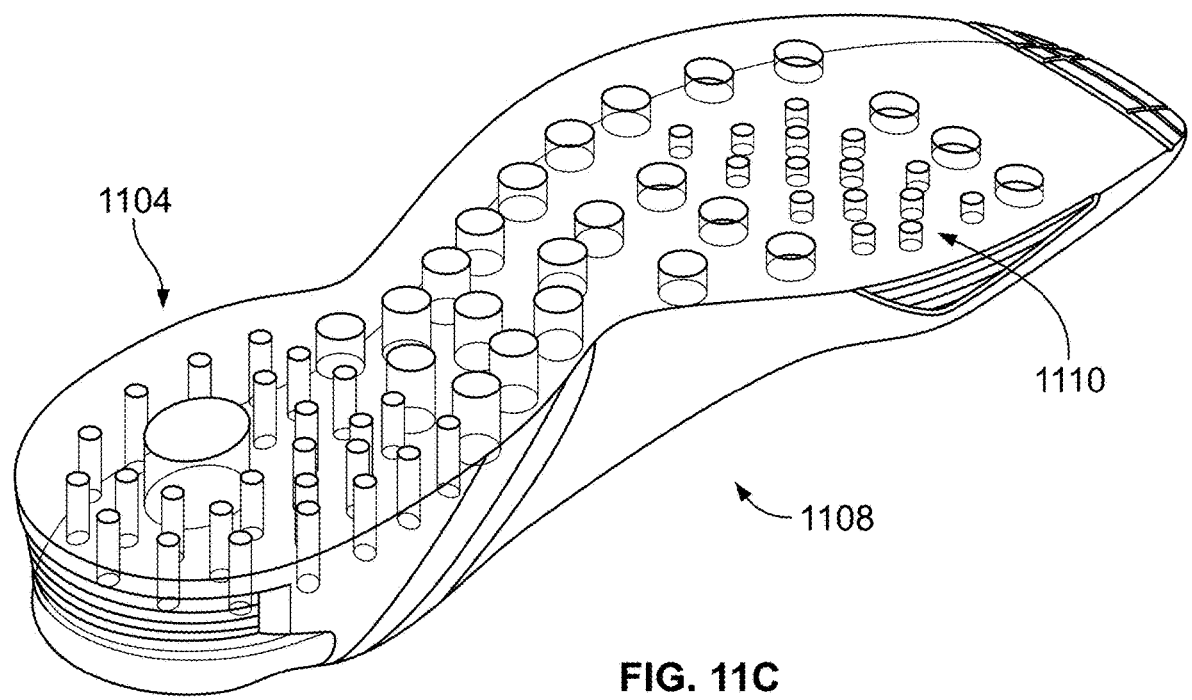

FIG. 11C shows another example midsole design 1108 in which recesses are dispersed around most of the bottom of the midsole structure, including the relatively large heel recess 1104. In this midsole design 1108, however, the set of three relatively large forefoot recesses 1106 of FIG. 11B is replaced by a series of more (and substantially smaller) recesses 1110 in the forefoot metatarsal head support area. This midsole recess design 1108 may be useful (and optimum) for a different type or class of player and/or a player having a different set of use desires or requirements. For example, while the midsoles 1102 and 1108 may weigh the same or substantially the same, the different forefoot metatarsal head support areas (due to the different recess designs 1104 v. 1110) will have a different feel and impact force attenuation properties, e.g., when pushing off for a step, when initiating a jump, etc. The forefoot area of the midsole design of FIG. 11B may feel somewhat firmer and/or more responsive that the design of FIG. 11C.

Figure 11D:
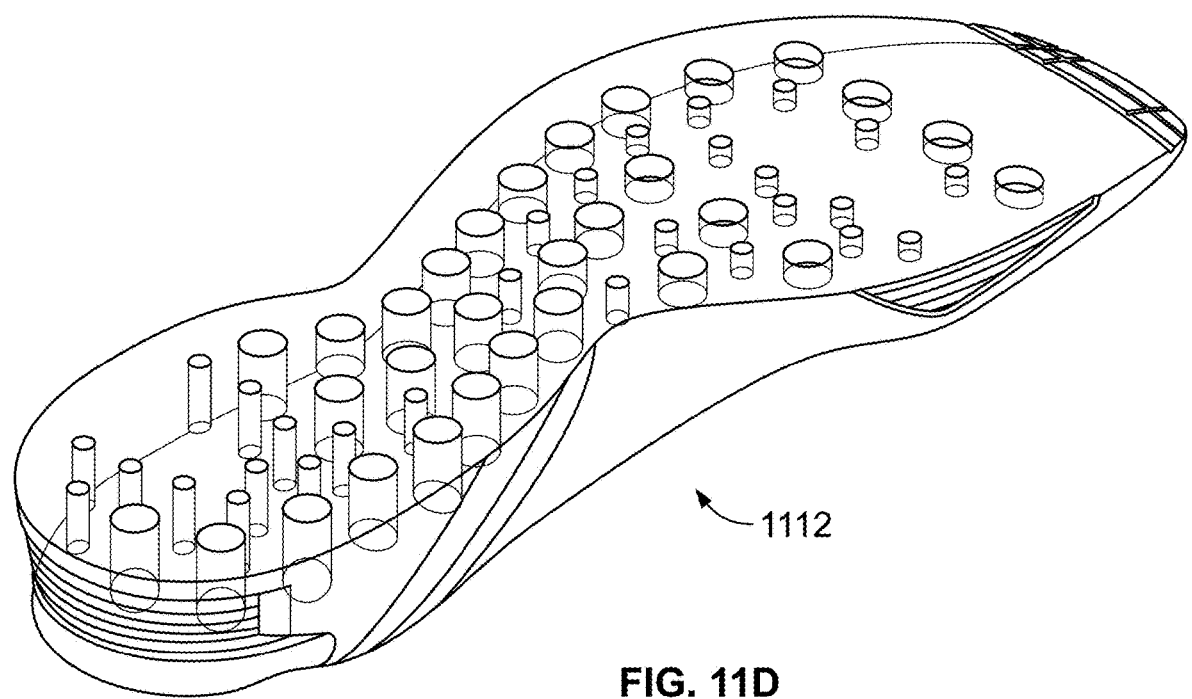

FIG. 11D shows another example midsole design 1112. As compared to the designs of FIGS. 11B and 11C, midsole design 1112 eliminates both the large recess 1104 in the heel area and the recesses 1106, 1110 in the forefoot metatarsal head support area. While perhaps somewhat heavier, this midsole design 1112 may provide a softer but less responsive feel as compared to the feel of sole structures of FIGS. 11B and 11C including sealed fluid-filled chambers in these areas.

Those skilled in the art will recognize that many variations and modifications can be made to the midsole designs to arrive at the desired support, weight, and impact force attenuation characteristics. Variations to the recess locations, recess sizes, recess shapes, wall draft angles, gas pressure, and the like may be changed to control or fine tune the characteristics of the sole and its feel. Design methods of the types described above may be used to create designs of midsole recesses for sole structures of any of the various types described above, e.g., with respect to FIGS. 1 through 9. Also, while discussed primarily in terms of midsole recess designs, this same type of foot pressure data and this type of system also may be used to design features of the outsole, such as the features of the outsole component that also define features of the fluid-filled chamber, such as wall height, wall angles, etc.

Much of the above discussion regarding design has focused on designing and customizing a midsole and/or outsole construction for an individual, e.g., based on that individual's foot pressure data. Footwear manufacturers can utilize aspects of this invention in other manners as well. For example, by researching foot pressure patterns and data of several individuals and properly categorizing the data (e.g., correlating foot pressure data to individual's height, weight, gait characteristics, sprint speed, normal running speed, activities, position, etc.), footwear can be designed, mass produced, and marketed toward specific classes or groups of people. For example, a footwear manufacturer could produce distance running shoes with different midsole patterns targeted to persons of different weights or arch types (e.g., with one midsole recess pattern for 140-160 pounds, another midsole recess pattern for 160-180 pounds, etc.; with one midsole recess pattern for over-pronators and another for over-supinators, etc.; etc.); different gait characteristics; etc. "Quarterback," "defensive back," "lineman," "linebacker," and/or other sport or position targeted shoes also could be marketed (having different midsole recess patterns). Tags or packaging for the footwear can be used to indicate the groups or classes of people for which the specific shoes were designed. As yet another example, different fluid-filled chamber designs could be provided in the right and left shoes of a pair to provide different foot support and/or impact force attenuation properties for the right foot v. the left foot (e.g., marketed to right or left handed pitchers, quarterbacks, golfers, hitters (baseball or softball), etc.).

Various example structures are disclosed above and in the accompanying drawings. The purpose served by the disclosure, however, is to provide an example of the various features and concepts related to the invention, not to limit the scope of the invention. One skilled in the relevant art will recognize that numerous variations and modifications may be made to the structures described above without departing from the scope of the present invention, as defined by the appended claims.

We claim:

1. A sole structure for an article of footwear, comprising:
a midsole having an upper surface, an opposed lower surface, a plurality of fluid-filled midsole recesses formed in the lower surface, and a plurality of midsole engagement surfaces, each midsole engagement surface extending completely around a corresponding one of the midsole recesses, the midsole recesses extending only part way into the lower surface of the midsole such that the midsole is a continuous single layer of material above the midsole recesses, wherein one or more of the plurality of fluid-filled midsole recesses are non-circular and formed with a draft angle which is defined between an upper wall surface and a sidewall surface extending angularly from the upper wall surface forming the one or more of the plurality of fluid-filled midsole recesses, the draft angle formed in the range of 91 to 135 degrees; and
an outsole defining a plurality of fluid-filled outsole recesses formed in a top portion thereof and having and a plurality of outsole engagement surfaces, each outsole engagement surface extending completely around a corresponding one of the outsole recesses,
wherein each midsole engagement surface engages one of the outsole engagement surfaces, wherein the midsole recesses align with the outsole recesses to form a plurality of separately distinct fluid-filled chambers that contain only fluid, wherein the midsole and outsole are in contact with one another to define a sealed perimeter area around each chamber such that the chambers are not in fluid communication with one another, and further wherein the outsole recesses define an exterior surface of the outsole, which corresponds to a shape and a size of the outsole recesses and provides a portion of a traction element on the exterior surface of the outsole, and further wherein at least some portions of engagement surfaces of the outsole, which engages the midsole, are recessed into the lower surface of the midsole with respect to a base surface level of the midsole.

2. The sole structure of claim 1, wherein the fluid-filled chambers have a side wall and a top wall, and wherein the top wall and the side wall form a draft angle.

3. The sole structure of claim 1, wherein the midsole and the outsole together define a seam that traps air between the midsole and the outsole.

4. The sole structure of claim 3, wherein the seam includes a groove formed in one of the midsole and the outsole and a tongue formed in one of the midsole and the outsole, wherein the tongue is engaged with the groove to form the seam.

5. The sole structure of claim 1, wherein the midsole has a forefoot portion and a heel portion, wherein the plurality of fluid-filled chambers provide a first impact force attenuation effect at the forefoot portion and a second impact force attenuation effect at the heel portion, and wherein the first impact force attenuation effect is different from the second impact force attenuation effect.

6. The sole structure of claim 1, wherein at least some of the plurality of the fluid-filled chambers are circular, spherical, or diamond shaped.

7. A sole structure for an article of footwear, comprising:
a midsole component including a top surface and a bottom surface opposite the top surface, wherein the bottom surface of the midsole component includes:
(a) a first recess including one or more interior walls extending in a direction toward the top surface of the midsole component and extending only part way into the midsole component, wherein a first engagement surface extends completely around a perimeter of the first recess, and
(b) a second recess including one or more interior walls extending in a direction toward the top surface of the midsole component and extending only part way into the midsole component, wherein a second engagement surface extends completely around a perimeter of the second recess, wherein one or more of the first recess or the second recess is non-circular and formed with a draft angle which is defined between an upper wall surface and a sidewall surface extending angularly from the upper wall surface forming the first recess or the second recess, the draft angle formed in the range of 91 to 135 degrees; and
an outsole component including a top surface and a bottom surface opposite the top surface, wherein the top surface of the outsole component includes:
(a) a third engagement surface and one or more interior walls extending from the third engagement surface and in a direction toward the bottom surface of the outsole component, and (b) a fourth engagement surface and one or more interior walls extending from the fourth engagement surface and in a direction toward the bottom surface of the outsole component, wherein the midsole component and outsole component are engaged together such that:
(a) the first engagement surface engages the third engagement surface so that the first recess and the top surface of the outsole component form a first enclosed fluid-filled chamber sealed about a perimeter of the first enclosed fluid-filled chamber,
(b) the second engagement surface engages the fourth engagement surface so that the second recess and the top surface of the outsole component form a second enclosed fluid-filled chamber sealed about a perimeter of the second enclosed fluid-filled chamber, and wherein the first enclosed fluid-filled chamber and the second enclosed fluid-filled chamber are not in fluid communication with one another and contain only fluid; and wherein the top surface of the midsole component is continuous and free of apertures, and further wherein the outsole component includes outsole recesses that define an exterior surface of the outsole component, which corresponds to a shape and a size of the outsole recesses and provides a portion of a traction element on the bottom surface of the outsole component, and further wherein at least some portions of engagement surfaces of the outsole component, which engages the midsole, are recessed into the lower surface of the midsole with respect to a base surface level of the midsole.

8. A sole structure according to claim 7, wherein each of the first recess and the second recess is located in a heel supporting region of the midsole component.

9. A sole structure according to claim 7, wherein each of the first recess and the second recess is located in a forefoot supporting region of the midsole component.

10. A sole structure according to claim 7, wherein the first enclosed fluid-filled chamber and the second enclosed fluid-filled chamber at least partially align with one another in a medial side-to-lateral side direction across the sole structure.

11. A sole structure according to claim 7, wherein the first enclosed fluid-filled chamber and the second enclosed fluid-filled chamber at least partially align with one another in a heel-to-toe direction across the sole structure.

12. A sole structure according to claim 7, wherein the midsole component includes a heel supporting region and a forefoot supporting region formed as a unitary, one-piece construction, and wherein the outsole component includes a heel supporting region and a forefoot supporting region formed as a unitary, one-piece construction.

13. A sole structure according to claim 7, wherein each of the first recess and the second recess is located in a heel supporting region of the midsole component, wherein the midsole component further includes a forefoot supporting region, and wherein the bottom surface of the midsole component in the forefoot supporting region includes:
(a) a third recess including one or more interior walls extending in a direction toward the top surface of the midsole component, wherein a fifth engagement surface extends around at least a portion of a perimeter of the third recess, and
(b) a fourth recess including one or more interior walls extending in a direction toward the top surface of the midsole component, wherein a sixth engagement surface extends around at least a portion of a perimeter of the fourth recess, wherein the outsole component further includes a forefoot supporting region, wherein the top surface of the outsole component in the forefoot supporting region includes:

(a) a seventh engagement surface and one or more interior walls extending from the seventh engagement surface and in a direction toward the bottom surface of the outsole component, and (b) an eighth engagement surface and one or more interior walls extending from the eighth engagement surface and in a direction toward the bottom surface of the outsole component, wherein the midsole component and the outsole component are further engaged together such that:

(a) the fifth engagement surface engages the seventh engagement surface so that the third recess and the top surface of the outsole component form a third enclosed fluid-filled chamber, (b) the sixth engagement surface engages the eighth engagement surface so that the fourth recess and the top surface of the outsole component form a fourth enclosed fluid-filled chamber, and wherein the third enclosed fluid-filled chamber and the fourth enclosed fluid-filled chamber are not in fluid communication with one another.

14. A sole structure according to claim 7, wherein the first engagement surface includes a projecting tongue component extending around at least a portion of the perimeter of the first recess, wherein the third engagement surface includes a groove, and wherein the projecting tongue component is received within the groove to, at least in part, engage the midsole component with the outsole component.

15. A sole structure according to claim 14, wherein the projecting tongue component extends completely around the perimeter of the first recess.

16. A sole structure according to claim 7, wherein the first engagement surface includes a first projecting tongue component extending around at least a portion of the perimeter of the first recess, wherein the third engagement surface includes a first groove, and wherein the first projecting tongue component is received within the first groove to, at least in part, engage the midsole component with the outsole component, and wherein the second engagement surface includes a second projecting tongue component extending around at least a portion of the perimeter of the second recess, wherein the fourth engagement surface includes a second groove, and wherein the second projecting tongue component is received within the second groove to, at least in part, engage the midsole component with the outsole component.

17. A sole structure according to claim 7, wherein the first engagement surface includes a groove defined around at least a portion of the perimeter of the first recess, wherein the third engagement surface includes a projecting tongue component, and wherein the projecting tongue component is received within the groove to, at least in part, engage the midsole component with the outsole component.

18. A sole structure according to claim 17, wherein the groove extends completely around the perimeter of the first recess.

19. A sole structure according to claim 7, wherein the first engagement surface includes a first groove defined around at least a portion of the perimeter of the first recess, wherein the third engagement surface includes a first projecting tongue component, and wherein the first projecting tongue component is received within the first groove to, at least in part, engage the midsole component with the outsole component, and wherein the second engagement surface includes a second groove defined around at least a portion of the perimeter of the second recess, wherein the fourth engagement surface includes a second projecting tongue component, and wherein the second projecting tongue component is received within the second groove to, at least in part, engage the midsole component with the outsole component.

20. A sole structure according to claim 7, wherein the first and second enclosed fluid-filled chambers are filled with air.

* * * * *